(12) United States Patent
Sinha et al.

(10) Patent No.: US 10,839,556 B2
(45) Date of Patent: Nov. 17, 2020

(54) CAMERA POSE ESTIMATION USING OBFUSCATED FEATURES

(71) Applicant: Microsoft Technology Licensing, LLC, Redmond, WA (US)

(72) Inventors: Sudipta Narayan Sinha, Kirkland, WA (US); Marc Andre Leon Pollefeys, Zurich (CH); Sing Bing Kang, Redmond, WA (US); Pablo Alejandro Speciale, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 16/168,601

(22) Filed: Oct. 23, 2018

(65) Prior Publication Data
US 2020/0126256 A1 Apr. 23, 2020

(51) Int. Cl.
*G06T 7/73* (2017.01)
*G06K 9/62* (2006.01)
*G06T 17/10* (2006.01)

(52) U.S. Cl.
CPC .............. *G06T 7/75* (2017.01); *G06K 9/6211* (2013.01); *G06T 17/10* (2013.01); *G06T 2215/16* (2013.01)

(58) Field of Classification Search
CPC .................. G06T 7/75; G06T 2207/30244
See application file for complete search history.

(56) References Cited

U.S. PATENT DOCUMENTS

| | | | |
|---|---|---|---|
| 8,798,357 B2 | 8/2014 | Sinha et al. | |
| 9,886,774 B2 | 2/2018 | Fathi et al. | |
| 2014/0368645 A1 | 12/2014 | Ahuja et al. | |
| 2016/0098858 A1 | 4/2016 | Patkar et al. | |
| 2016/0210783 A1 | 7/2016 | Tomlin et al. | |
| 2017/0124714 A1 | 5/2017 | Sridhar et al. | |
| 2020/0005486 A1 | 1/2020 | Sinha et al. | |

OTHER PUBLICATIONS

Borges, et al., "Vision-based Localization Using an Edge Map Extracted from 3D Laser Range Data", In Proceedings of International Conference on Robotics and Automation, May 3, 2010, pp. 4902-4909.

(Continued)

*Primary Examiner* — Tuan H Nguyen
(74) *Attorney, Agent, or Firm* — Alleman Hall Creasman & Tuttle LLP

(57) ABSTRACT

A method for estimating a camera pose includes recognizing a three-dimensional (3D) map representing a physical environment, the 3D map including 3D map features defined as 3D points. An obfuscated image representation is received, the representation derived from an original unobfuscated image of the physical environment captured by a camera. The representation includes a plurality of obfuscated features, each including (i) a two-dimensional (2D) line that passes through a 2D point in the original unobfuscated image at which an image feature was detected, and (ii) a feature descriptor that describes the image feature associated with the 2D point that the 2D line of the obfuscated feature passes through. Correspondences are determined between the obfuscated features and the 3D map features of the 3D map of the physical environment. Based on the determined correspondences, a six degree of freedom pose of the camera in the physical environment is estimated.

20 Claims, 13 Drawing Sheets

(56) References Cited

OTHER PUBLICATIONS

Lee, et al., "Line-Based Recognition Using 3D Lines and Occlusion Query", In Proceedings of International Conference on Information Science and Applications, Apr. 21, 2010, 8 Pages.

Li, et al., "Worldwide Pose Estimation Using 3D Point Clouds", In European Conference on Computer Vision, Oct. 7, 2012, pp. 15-29.

"International Search Report and Written Opinion Issued in PCT Patent Application No. PCT/US2019/038794", dated Oct. 23, 2019, 12 Pages.

Pribyl, et al., "Camera Pose Estimation from Lines using Plucker Coordinates", In repository of arXiv, arXiv:1608.02824, Aug. 9, 2016, pp. 1-12.

"Scale-invariant feature transform", Retrieved From: https://en.wikipedia.org/wiki/Scale-invariant_feature_transform, Retrieved on: Sep. 18, 2018, 15 Pages.

Camposeco, et al., "Hybrid Camera Pose Estimation", In Proceedings of IEEE Conference on Computer Vision and Pattern Recognition, Jun. 18, 2018, pp. 136-144.

Dosovitskiy, et al., "Inverting Visual Representations with Convolutional Networks", In Proceedings of the IEEE Conference on Computer Vision and Pattern Recognition, Jun. 26, 2016, pp. 4829-4837.

Fraundorfer, et al., "A Minimal Case Solution to the Calibrated Relative Pose Problem for the Case of Two Known Orientation Angles", In Proceedings of European Conference on Computer Vision, Sep. 5, 2010, pp. 1-15.

Khoshelham, Kourosh, "Direct 6-DoF Pose Estimation from Point-Plane Correspondences", In Proceedings of International Conference on Digital Image Computing: Techniques and Applications (DICTA), Nov. 23, 2015, 6 Pages.

Kniep, et al., "Efficient computation of relative pose for multi-camera systems", In Proceedings of IEEE Conference on Computer Vision and Pattern Recognition, Jun. 23, 2014, 8 Pages.

Lee, et al., "Relative pose estimation for a multi-camera system with known vertical direction", In Proceedings of IEEE Conference on Computer Vision and Pattern Recognition, Jun. 23, 2014, pp. 1-8.

Li, et al., "A linear approach to motion estimation using generalized camera models", In Proceedings of IEEE Conference on Computer Vision and Pattern Recognition, Jun. 23, 2008, 8 Pages.

Lim, et al., "Real-time monocular image-based 6-DoF localization", In the International Journal of Robotics Research, vol. 34, Issue 4-5, Apr. 3, 2015, pp. 476-492.

Nister, David, "A Minimal Solution to the Generalized 3-Point Pose Problem", In Proceedings of IEEE Computer Society Conference on Computer Vision and Pattern Recognition, Jun. 27, 2004, 8 Pages.

Nister, David, "An efficient solution to the five-point relative pose problem", In Journal of IEEE Transactions on Pattern Analysis and Machine Intelligence, vol. 26, Issue 6, Jun. 2004, pp. 756-770.

Ramalingam, Srikumar, "A theory of minimal 3D point to 3D plane registration and its generalization", In International Journal of Computer Vision, vol. 102, Issue 1-3, Sep. 27, 2012, 20 Pages.

Ramalingam, et al., "P2Pi: A Minimal Solution for Registration of 3D Points to 3D Planes", In Proceedings of European Conference on Computer Vision, Nov. 2010, 16 Pages.

Stewenius, et al., "Solutions to minimal generalized relative pose problems", In Proceedings of 6th Workshop on Omnidirectional Vision Camera Networks and Non-Classical Cameras, Oct. 21, 2005, 8 Pages.

Sweeney, et al., "Efficient computation of absolute pose for gravity-aware augmented reality", In Proceedings of IEEE International Symposium on Mixed and Augmented Reality, Sep. 29, 2015, pp. 19-24.

Sweeney, Chris, et al., "gDLS: A Scalable Solution to the Generalized Pose and Scale Problem", In Proceedings of European Conference on Computer Vision, Sep. 6, 2014, pp. 16-31.

Sweeney, Chris, et al., "Solving for Relative Pose with a Partially Known Rotation is a Quadratic Eigenvalue Problem", In Proceedings of 2nd International Conference on 3D Vision, Dec. 8, 2014, 8 Pages.

Weinzaepfel, et al., "Reconstructing an image from its local descriptors", In Proceedings of Computer Vision and Pattern Recognition, Jun. 20, 2011, 9 Pages.

Sinha, et al., "Device Pose Estimation Using 3D Line Clouds", Application As Filed in U.S. Appl. No. 16/025,120, filed Jul. 2, 2018, 64 Pages.

"International Search Report and Written Opinion Issued in PCT Application No. PCT/US2019/056283", dated Dec. 16, 2019, 26 Pages.

Speciale, et al., "Privacy Preserving Image-Based Localization", In Repository of arxiv, arXiv:1903.05572 [cs.CV], Mar. 13, 2019, 12 Pages.

Ramalingam, et al., "P2i : A Minimal Solution for Registration of 3D Points to 3D Planes", In Proceedings of the European Conference on Computer Vision, Sep. 5, 2010, pp. 436-449.

Andres, et al., "Geo-Indistinguishability: Differential Privacy for Location-Based Systems", In Proceedings of the ACM SIGSAC conference on Computer and Communications Security, Nov. 4, 2013, pp. 901-914.

Khoshelham, et al., "Direct 6-DoF Pose Estimation from Point-Plane Correspondences", In Proceedings of the International Conference on Digital Image Computing: Techniques and Applications (DICTA), Nov. 23, 2015, 6 Pages.

Sweeney, et al., "Efficient Computation of Absolute Pose for Gravity-Aware Augmented Reality", In Proceedings of the IEEE International Symposium on Mixed and Augmented Reality, Sep. 29, 2015, pp. 19-24.

"Non Final Office Action Issued in U.S. Appl. No. 16/025,120", dated Aug. 20, 2020, 18 pages.

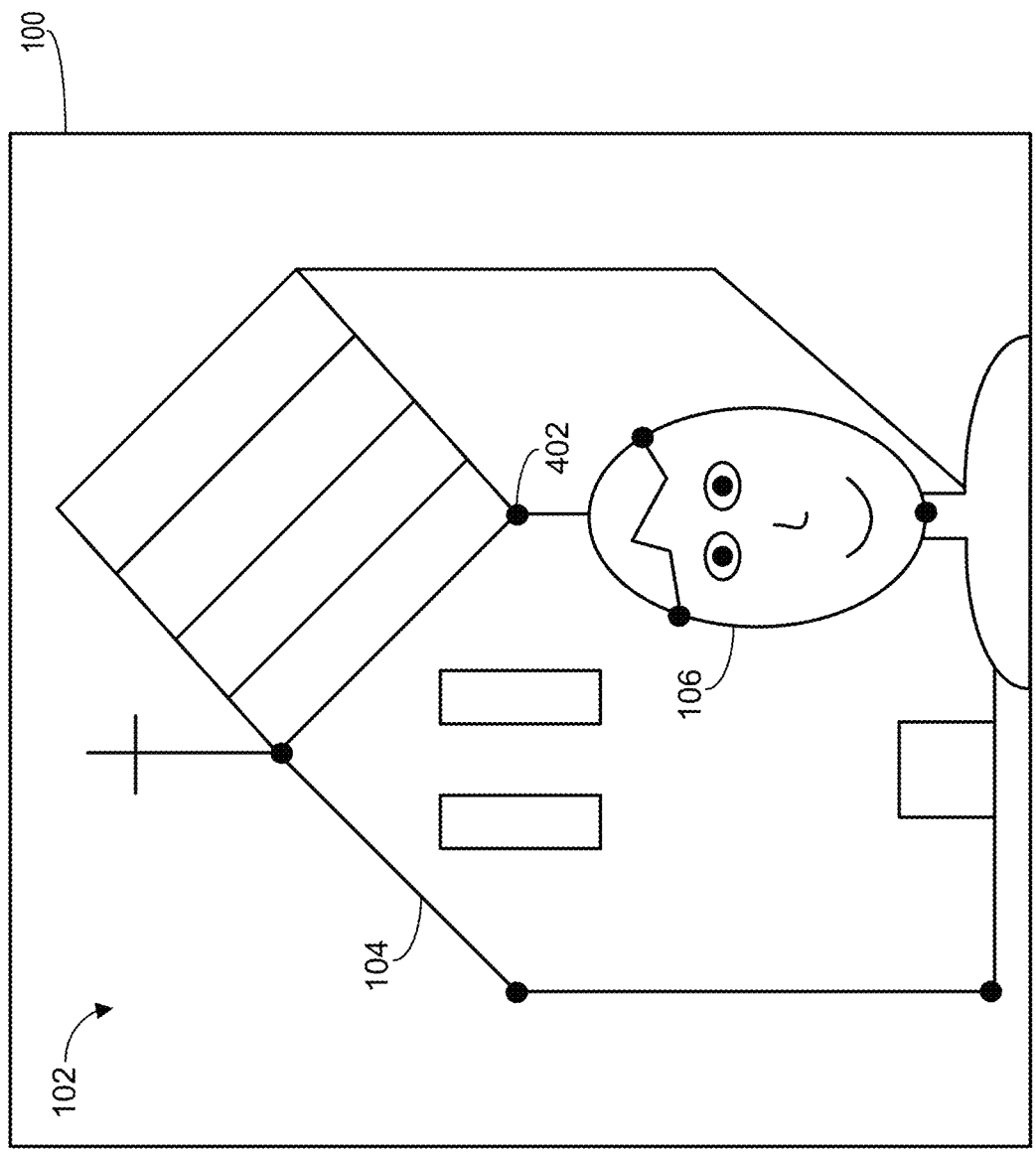

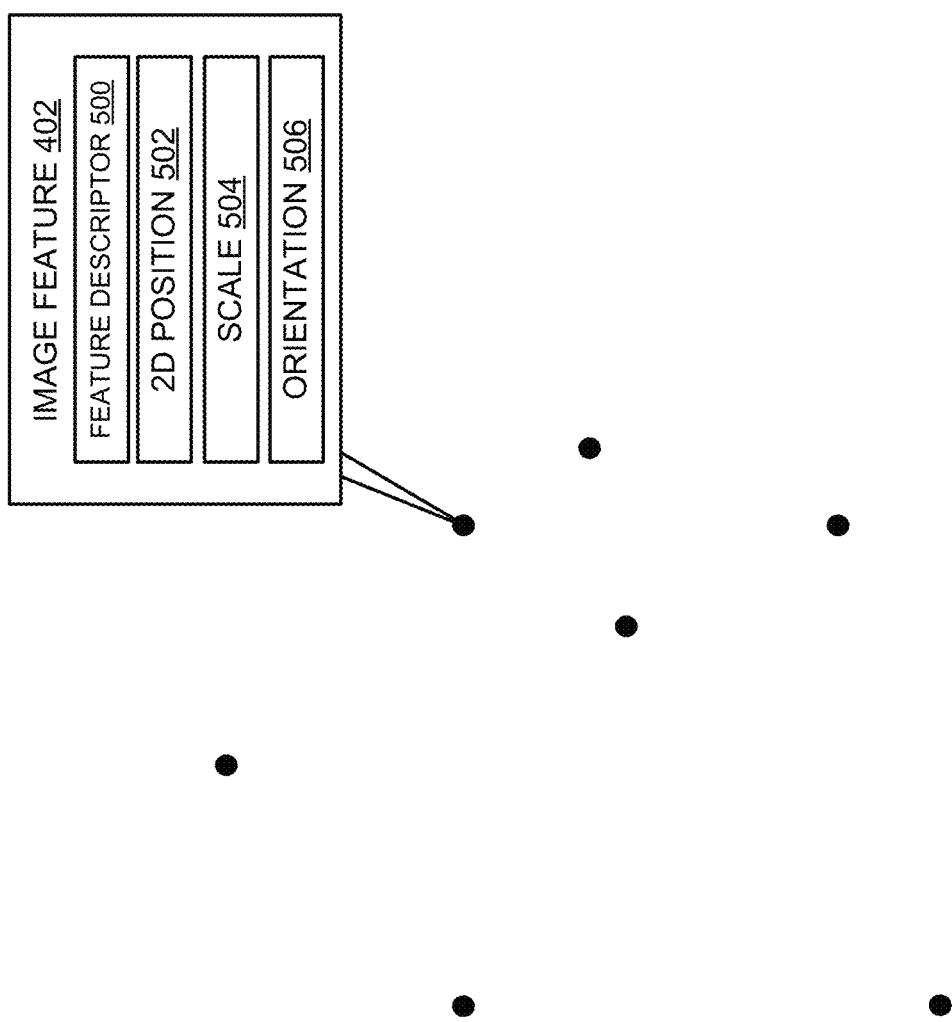

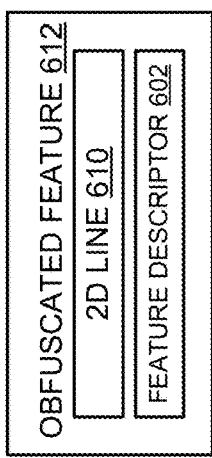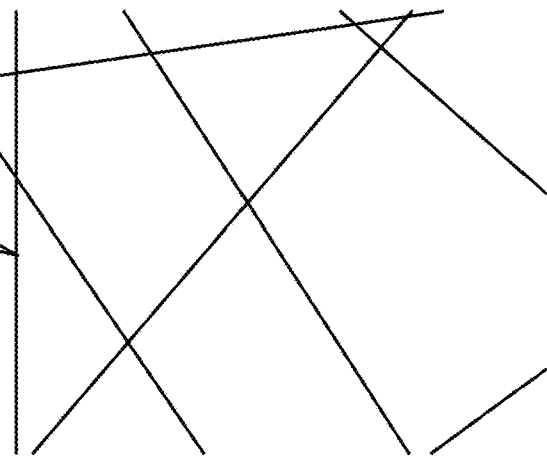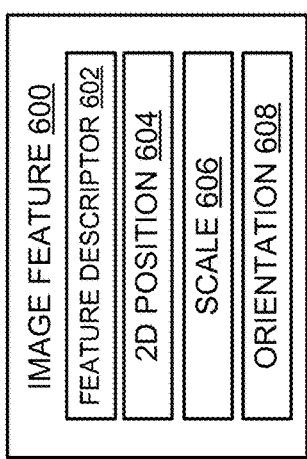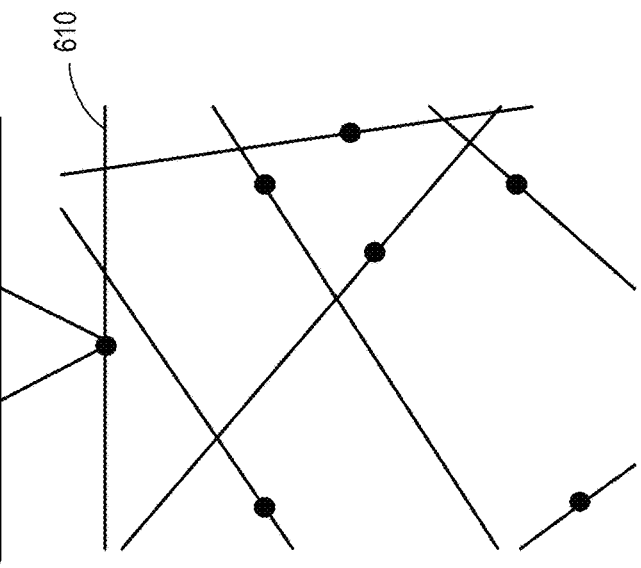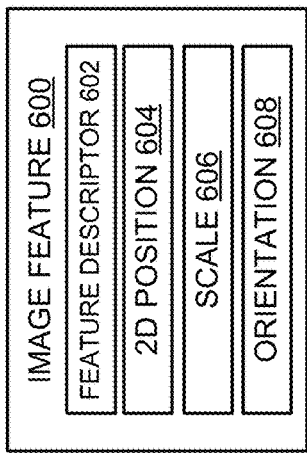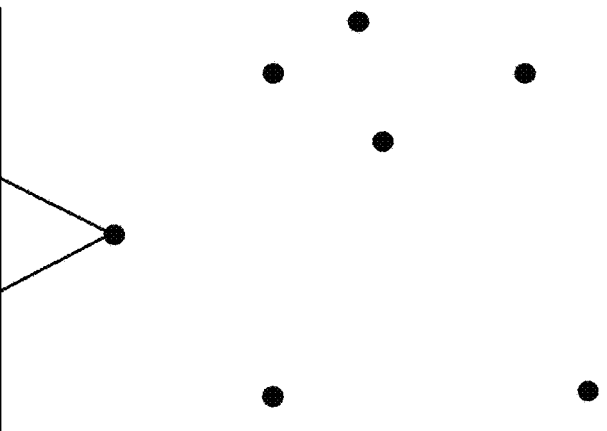
FIG. 6A
FIG. 6B
FIG. 6C

700

```
┌─────────────────────────────────────────────────────────────┐
│ OBTAIN A THREE-DIMENSIONAL MAP REPRESENTING A PHYSICAL      │
│ ENVIRONMENT, THE MAP INCLUDING A PLURALITY OF MAP FEATURES  │
│ DEFINED IN THREE DIMENSIONS                                 │
│                                                         702 │
└─────────────────────────────────────────────────────────────┘
                               │
                               ▼
┌─────────────────────────────────────────────────────────────┐
│ RECEIVE AN OBFUSCATED IMAGE REPRESENTATION DERIVED FROM     │
│ AN IMAGE OF THE PHYSICAL ENVIRONMENT                        │
│                                                         704 │
└─────────────────────────────────────────────────────────────┘
                               │
                               ▼
┌─────────────────────────────────────────────────────────────┐
│ DETERMINE CORRESPONDENCES BETWEEN OBFUSCATED FEATURES       │
│ AND THREE-DIMENSIONAL MAP FEATURES                          │
│                                                         706 │
└─────────────────────────────────────────────────────────────┘
                               │
                               ▼
┌─────────────────────────────────────────────────────────────┐
│ ESTIMATE A POSE OF THE CAMERA IN THE PHYSICAL ENVIRONMENT   │
│                                                         708 │
└─────────────────────────────────────────────────────────────┘
```

FIG. 7

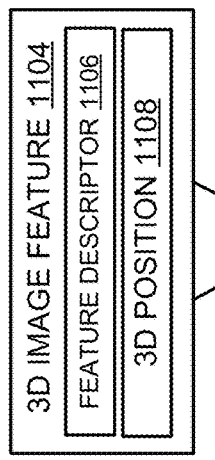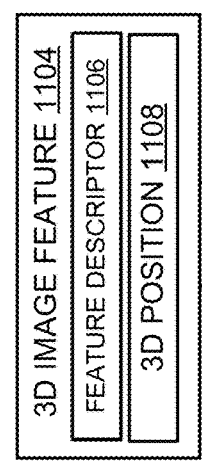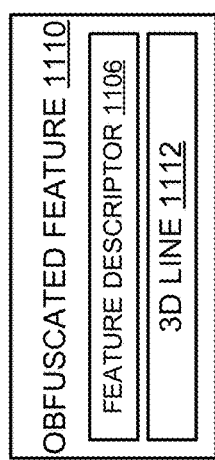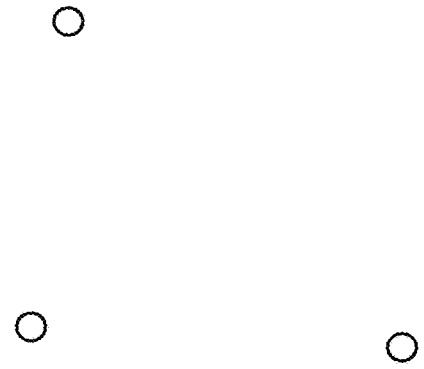
FIG. 11B
FIG. 11C
FIG. 11D

CAMERA POSE ESTIMATION USING OBFUSCATED FEATURES

BACKGROUND

Image-based localization techniques may be utilized by mobile display devices, robots, drones and other devices to estimate their position and orientation in a physical environment. For example, one or more images captured by a device may be compared to a precomputed map representing a 3D reconstruction of the space.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for estimating a camera pose includes recognizing a three-dimensional (3D) map representing a physical environment, the 3D map including a plurality of 3D map features defined as 3D points distributed throughout the 3D map. An obfuscated image representation is received, the representation derived from an original unobfuscated image of the physical environment captured by a camera. The representation includes a plurality of obfuscated features, each including (i) a two-dimensional (2D) line that passes through a 2D point in the original unobfuscated image at which an image feature was detected, and (ii) a feature descriptor that describes the image feature associated with the 2D point that the 2D line of the obfuscated feature passes through. Correspondences are determined between the obfuscated features and the 3D map features of the 3D map of the physical environment. Based on the determined correspondences, a six degree of freedom pose of the camera in the physical environment is estimated.

BRIEF DESCRIPTION OF THE DRAWINGS

FIG. 4 depicts the example image of the physical environment of FIG. 1 with image features detected in the image.

FIG. 5 depicts image features detected in the image of FIG. 4.

FIG. 6A shows an example image feature including a 2D position.

FIG. 6B shows a 2D line passing through the 2D point associated with the example image feature of FIG. 6A.

FIG. 6C shows an obfuscated feature corresponding to the example image feature of FIG. 6A, but with the 2D line of FIG. 6B replacing the 2D position of FIG. 6A.

FIG. 7 illustrates another example method for estimating a camera pose.

FIGS. 11A-11D illustrate generation of an obfuscated 3D local map based on two or more images of a physical environment.

DETAILED DESCRIPTION

Figure 1:
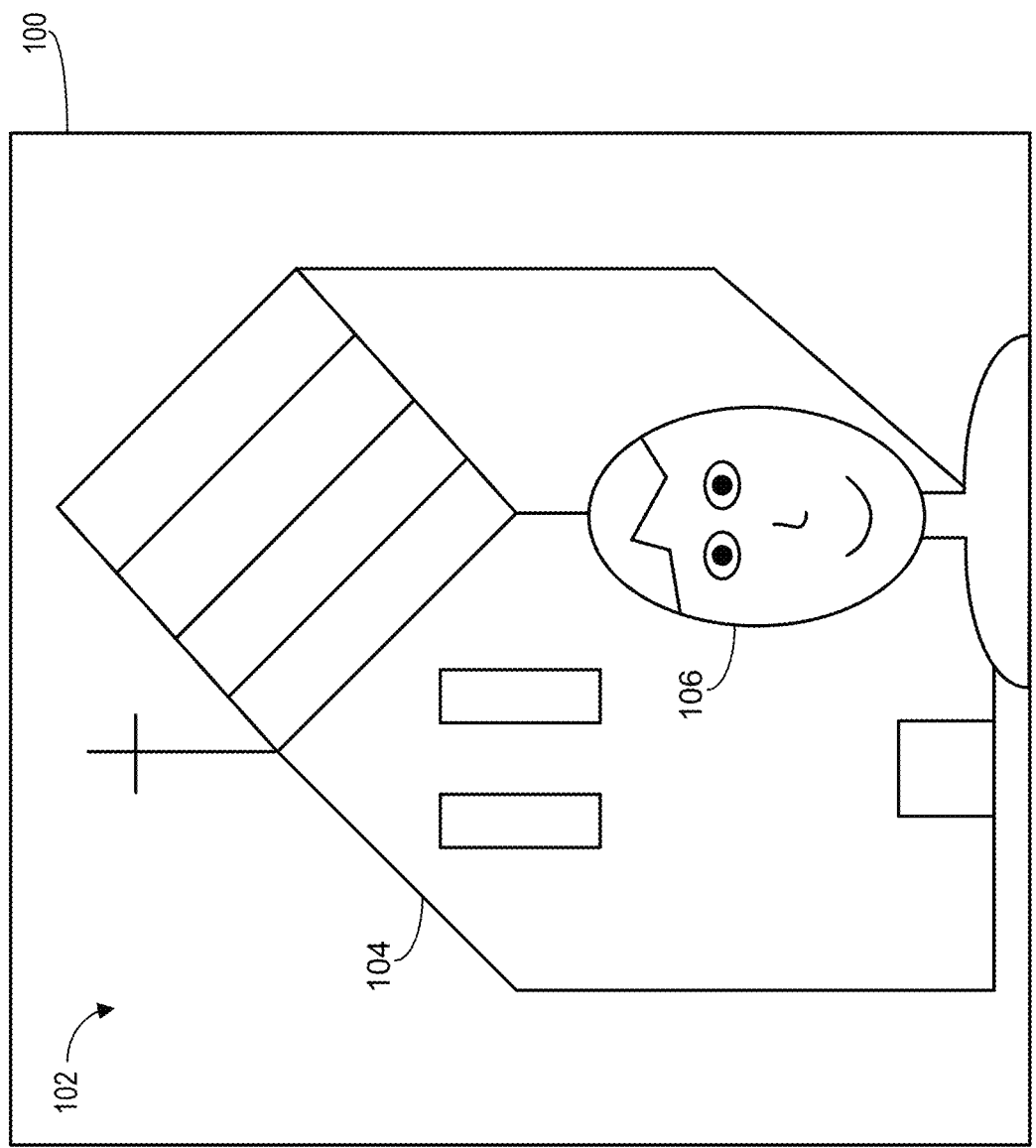
FIG. 1 depicts an example image of a physical environment.
Figure 3:
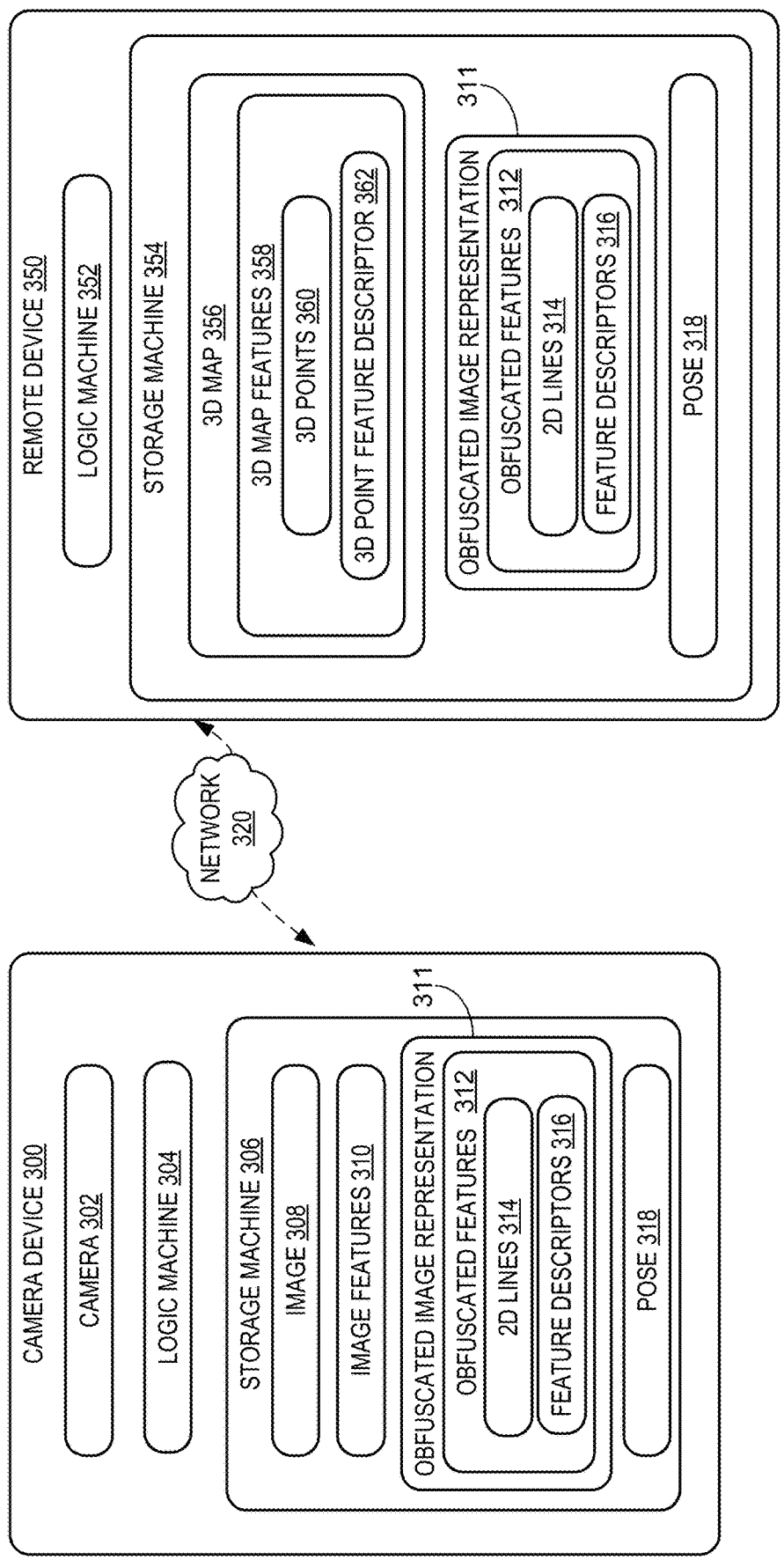
FIG. 3 schematically shows an example client-side device and remote device usable to estimate a camera pose.
Figure 12:
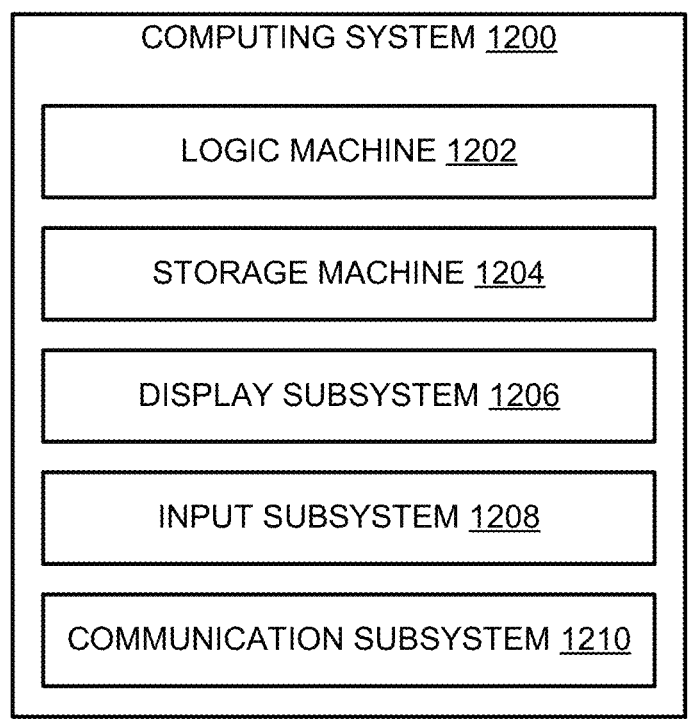
FIG. 12 schematically shows an example computing system.

A wide variety of devices and related technologies may utilize image-based localization techniques. Examples may include wearable computing devices, such as head-mounted display (HMD) devices that provide augmented reality and/or virtual reality experiences, robotic machines, and self-driving vehicles. These and other devices may use image-based localization techniques to determine their position and orientation (i.e., pose) in a physical environment. Herein, such devices will be referred to as "camera devices." Camera devices may have any suitable hardware and assume mobile or non-mobile form factors. Camera device 104, camera device 300, and computing system 1200 described below with respect to FIGS. 1, 3, and 12 are nonlimiting examples of camera devices.

Some approaches to image-based localization utilize knowledge of a prior three-dimensional (3D) map or scene model of a physical environment. The 3D map is essentially a spatial database including geometric data. In some examples, the geometric data includes points defined in three dimensions (e.g., x, y, z) distributed throughout 3D space to form a 3D point cloud reconstruction of the scene. The 3D points are associated with feature descriptors (e.g., multi-dimensional vectors) extracted from the source images or videos used to construct the map. Thus, the 3D points may be referred to as 3D map features of a 3D map of the physical environment.

Given a 3D map of a physical environment and using one or more images or videos captured by a camera, an image-based localization task may estimate the 3D position (x, y, z) and 3D orientation (roll, pitch, yaw) of the camera within the physical environment. Camera localization algorithms may solve this task in two steps—first by matching 2D point features in the captured image(s) to 3D map features stored in the 3D map as 3D points. Next, the 6 degree-of-freedom (6DOF) pose of the camera may be computed using the 2D point to 3D point matches and their underlying coordinates.

In some cases, camera localization may be performed by a device other than the camera device used to capture the images, potentially conserving processing, battery, and/or storage resources of the camera device. For instance, the images may be transmitted to a remote device (e.g., server) that has access to the 3D map of the physical environment and performs the processing steps used to estimate the camera pose. Furthermore, transmitting images to a remote device alleviates the need for the 3D map to be shared with third parties, which can infer information about the physical environment based on the 3D map. The camera pose optionally may be transmitted back to the camera device. In some examples, however, images used to determine the camera pose may include sensitive, confidential, and/or private information related to the depicted physical environment. For example, the images may depict user faces, sensitive or personal items present in the scene, confidential information, etc. This presents a privacy concern when the images are transmitted to a remote device, as a user of the camera device may not wish for their private images to be transmitted to or stored on a remote device that they do not control.

Notably, image localization may be done on the basis of only the image features detected within the image. Thus, the actual image content (e.g., pixel values) need not be transmitted to the remote device, provided the image features (e.g., the 2D locations of the image features and their associated feature descriptors) are available to the remote device. However, it is possible in some cases to recreate a lossy representation of an original image based on information associated with the image features, namely the 2D positions at which the image features were detected in the image and the associated feature descriptors. In other words, upon receiving the 2D pixel positions of the image features within the image, along with the associated feature descriptors, a remote device may recreate images of a user's current surroundings, therefore potentially revealing private information.

The present disclosure addresses the above confidentiality and privacy concerns by obfuscating image features transmitted to a remote device. Specifically, upon capturing an image of a physical environment, a device may detect image features in the image, and generate a plurality of obfuscated features that represent the image features without revealing their associated 2D positions. Specifically, each obfuscated feature may include a 2D line that passes through the 2D position at which an image feature was detected, and a feature descriptor that describes the image feature. The obfuscated features may be transmitted to a remote device as part of an obfuscated image representation for the purpose of camera pose estimation. Notably, the obfuscated image representation does not include the 2D positions of the image features, making it significantly more difficult, if not impossible, for the remote device to recreate the original image. Nevertheless, the obfuscated image representation may include sufficient information for the remote device to estimate the pose of the camera relative to the 3D map of the physical environment. Thus, privacy concerns associated with transmission of potentially private information to a remote device may be mitigated, while preserving advantages of using a remote device to perform camera localization, such as conservation of processing, storage, and battery resources of the camera device.

FIG. 1 depicts an image 100 of a physical environment 102. Though not shown in FIG. 1, image 100 has been taken by a camera device configured to capture images of the physical environment. Such images may be used to estimate the pose of the camera relative to the physical environment. When the camera device is an augmented or virtual reality device, this may enable the camera device to present virtual images to the user that, for example, appear to assume fixed positions within the physical environment, or appear to maintain a fixed position relative to the user. However, any suitable camera device may be used, and such a camera device may make use of an estimated camera pose for any suitable purpose. As one example, image 100 may be taken by camera 302 of camera device 300, which will be described below with respect to FIG. 3.

Environment 102 includes a structure 104, which in this case is a famous building. As discussed above, image 100 of physical environment 102 captured by a camera device may be transmitted to a remote device (e.g., server) for camera pose estimation. For instance, the remote device may have previously acquired a 3D map of the physical environment, the 3D map including a plurality of 3D map features. The map features may be characterized as a 3D point cloud representing a reconstruction of the physical environment. By determining correspondences between map features in the 3D map and image features detected in the image, the pose of the camera device at the time image 100 was captured may be deduced.

However, the image of environment 102 also includes a user 106 whose face is clearly visible in the image. The user may not wish for an image of their face to be transmitted to a remote device that the user does not control, as this presents a privacy concern. Even in the case where the remote device is trusted or controlled by the user (e.g., a personal or company-owned server), the image may be intercepted en route, and/or unlawfully retrieved from the server by another party. Furthermore, even when the information transmitted to the server only includes image features detected in the image and not the image pixel values themselves, it may be possible to recreate a lossy representation of the image, which can reveal the user's face.

Figure 2:
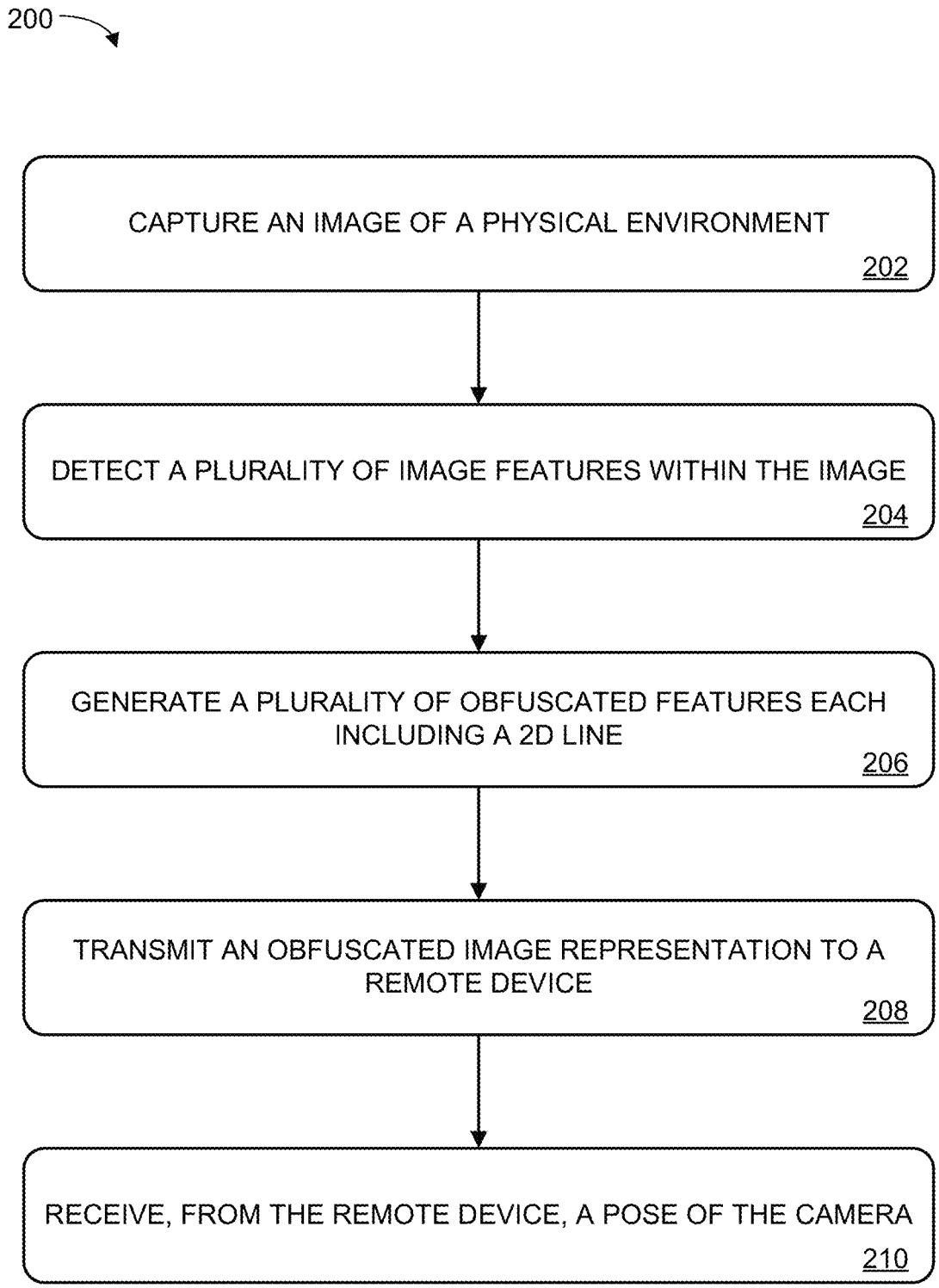
FIG. 2 illustrates an example method for estimating a camera pose.

Accordingly, FIG. 2 illustrates an example method 200 for estimating a camera pose that relies on an obfuscated image representation to prevent unauthorized recreation of the original image. Method 200 may be implemented on any suitable camera device and/or cooperating remote device. One example camera device is schematically shown in FIG. 3, which shows a camera device 300 and a cooperating remote device 350 communicatively coupled over a network 320. Each of camera device 300 and remote device 350 may take any suitable form. In different examples, the camera device 300 and/or remote device 350 may take the form of a head-mounted display, server, networking computer, gaming console, mobile communication device, desktop computer, laptop computer, tablet computer, set-top box (e.g. cable television box, satellite television box), or any other type of suitable computing device. As specific examples, the camera device may be implemented as an HMD, self-driving car, aerial drone, and/or other suitable camera device. Additional details regarding the components and computing aspects of camera device 300 and remote device 350 are described below with respect to FIG. 12.

At 202, method 200 of FIG. 2 includes capturing an image of a physical environment. As shown in FIG. 3, the camera device includes a camera 302 usable for capturing an image of a physical environment. In some examples, the camera 302 may comprise an RGB camera, IR camera, and/or depth camera (such as a time-of-flight, structured light, or other form of depth camera). Camera device 300 also includes a logic machine 304 and a storage machine 306 holding instructions executable by the logic machine to perform various computing tasks. Logic machine 304 and storage machine 306 may be implemented using any suitable data processing and data storage technologies, respectively. Additional details regarding the logic machine and storage machine are provided below with respect to FIG. 12.

In FIG. 3, an image 308 captured by camera 302 is held by storage machine 306 of camera device 300. Image 100 of FIG. 1 is one example of such an image, although a camera device may capture any image of any physical environment.

Returning to FIG. 2, at 204, method 200 includes detecting a plurality of image features at two-dimensional pixel locations within the image of the physical environment. This is shown in FIG. 3, as storage machine 306 of camera device 300 also includes a plurality of image features 310 associated with the image 308. Turning now to FIG. 4, image 100 of FIG. 1 is again shown, along with black dots representing the two-dimensional positions at which image feature have been detected. One such dot corresponds to an image feature 402. It will be understood that each dot shown in FIG. 4 may have an associated image feature, and that an image may have any number of such features.

With reference now to FIG. 5, the black dots from FIG. 4 representing the image features detected in image 100 are illustrated. As shown in this example, the two-dimensional distribution of the image features may reflect geometric attributes and the visual appearance of objects that are present in the physical environment at the time the image was taken. In the present example, the image features include features that correspond to the shape, dimensions and other features of the structure 104 and user 106.

FIG. 5 also includes a schematic representation of a single image feature 402. Depending on the implementation, an image feature may include any suitable information. As shown, image feature 402 includes a feature descriptor 500, a two-dimensional position 502 (e.g., the pixel coordinate of the black dot representing the image feature within the image), a scale 504, and a one-dimensional angular orientation 506.

Image features may take a variety of suitable forms and may be detected in a variety of suitable ways. As one example, the image features may be scale invariant feature transform (SIFT) features. A SIFT feature includes a SIFT keypoint, which stores geometric information relevant to the feature, including the 2D position, scale, and one-dimensional angular orientation of the feature. A SIFT feature also includes a feature descriptor, which is implemented as a 128-dimensional vector. A multi-step process may be used to detect SIFT features in an image. It will be understood, however, that this process is provided as an example. Any suitable approach for extracting local features may be used for identifying image features, and such image features need not be SIFT features. As another example, detected image features may be speeded-up robust features (SURF).

To identify SIFT features, multiple copies of the original image may be generated such that each new copy is progressively blurred. In some cases, once a predetermined number of blurred images is created, a new copy of the original image may be created that has a reduced size (e.g., half-size) as compared to the original image. Progressively blurred copies of the reduced size image may then be generated, and this may be repeated any number of times to give any number of sets (or "octaves") of image copies, each set having a different scale. The set of image copies may in some cases be referred to as a "scale space."

Once the scale space is generated, a Difference of Gaussian (DoG) operation may be performed to identify differences between image copies having the same scale (i.e., in the same octave). In other words, for two blurred copies of the original image having the same scale, with one copy being more blurred than the other, a DoG image is generated that indicates differences in pixel values between the two blurred copies. For example, any pixels that are the same in both blurred images (i.e., difference is zero) may be represented as black in the DoG image. Pixels that differ between the two blurred copies (i.e., difference is non-zero) may be represented in the DoG image with a non-black grayscale value, such that greater differences in pixel values are represented as being more white than smaller differences in pixel values. This results in sets of DoG images in which regions of higher variability in the original image (e.g., corners or edges within the image) are lighter in color than regions having less variability. Any suitable number of DoG images may be generated, depending on how many octaves of blurred image copies were generated.

Next, local maxima and minima may be identified within at least some of the DoG images. This may be done by checking, for each pixel in a given DoG image, whether that pixel has the highest or lowest value relative to some number (e.g., 26) of neighbor pixels. Once maxima and minima are identified at the pixel level, a Taylor expansion may be applied to maxima and minima within the DoG images to find the subpixel-level maxima and minima.

At least some of the identified maxima and minima may have relatively low contrast in the original image, lie along edges, and/or be generally unsuitable as image features. Thus, some number of maxima and minima may be excluded as SIFT features. This may be done by first excluding any pixels having less than a threshold intensity, which may be set to any suitable value depending on the total desired number and distinctiveness of final features. Next, for each potential feature, two perpendicular gradients may be calculated in the pixel vicinity of the potential feature and subtracted from each other. If the potential feature lies away from an edge or corner, both gradients will likely be small, and the difference will be near-zero. Similarly, if the potential feature lies at a corner, then both gradients will be large and the difference will again be near-zero. Potential features that lie along an edge will have a large gradient and a small gradient, for a relatively larger difference. Because features lying along edges are generally less desirable than corner features, edge features may be discarded. In some cases, corner features may be calculated using the Harris corner detector.

Once the final set of SIFT features has been identified, the keypoint orientations and feature descriptors may be calculated. Keypoint orientation may be calculated by evaluating gradient directions and magnitudes in the pixel vicinity of the feature, which can be collected in a histogram having a set number of bins (e.g., each bin corresponding to a range of angles). A highest magnitude bin may be set as the keypoint orientation. In cases where multiple high magnitude orientations are present, a single feature may be divided into multiple features, each having different orientations.

The SIFT feature descriptors may be calculated by examining a 16×16 window around each feature. For sixteen 4×4 windows within the 16×16 window, gradient magnitudes and orientations may be calculated and added to separate 8-bin histograms. In some cases, the magnitude with which an orientation is represented in a histogram may be weighted based on proximity to the feature. When 8-bin histograms are filled for each 4×4 window, 128 values representing the feature may be obtained (sixteen windows each filling eight histogram bins gives 128 total values). These 128 values may be normalized—for example by dividing by the root of total squares—to give a final 128-dimensional vector for each of the plurality of identified SIFT features. Thus, each SIFT feature detected in the image may have a two-dimensional pixel position, a scale, an orientation, and a SIFT feature descriptor. However, in other implementations, other types of feature descriptors may be used.

Turning again to FIG. 2, at 206, method 200 includes generating a plurality of obfuscated features. Each obfuscated feature includes a 2D line that passes through a 2D point at which an image feature was detected in the original, unobfuscated image (e.g., image 100) Furthermore, each obfuscated feature includes a feature descriptor that describes the image feature that the 2D line of the obfuscated feature passes through. In other words, and as will be discussed in more detail below, each image feature detected in an image may be represented by a 2D line passing through the 2D position of the image feature and a feature descriptor that describes the image feature. The 2D line and feature descriptor together comprise an obfuscated feature. An obfuscated representation of an entire image will include a plurality of such obfuscated features, each corresponding to a different image feature detected in the original, unobfuscated image.

This is illustrated in FIGS. 6A-6C. With reference now to FIG. 6A, black dots corresponding to the image features detected in image 100 are provided. Specifically, the black dots denote the 2D positions at which image features corresponding to structure 104 and user 106 were detected.

FIG. 6A also includes a schematic representation of a single image feature 600. As with image feature 402, image feature 600 includes a feature descriptor 602 (e.g., a 128-dimensional vector), a 2D position 604, a scale 606, and an orientation 608.

With reference now to FIG. 6B, to obfuscate the underlying geometry associated with each image feature, a plurality of 2D lines are generated, each passing through the 2D points denoted by the black dots. As shown, one example 2D line 610 passes through the black dot corresponding to image feature 600. In some examples, for each of the 2D lines, a direction for the line is randomly selected independently of the directions of other 2D lines such that each 2D line has a random 2D direction. In this manner, the original image features are obfuscated by a plurality of 2D lines.

In this manner and with reference now to FIG. 6C, the black dots denoting the 2D locations at which the image features were detected are no longer shown. As such, it is no longer possible to distinguish the 2D image locations from which the feature descriptors were derived, as any algorithm that attempts to infer the appearance of the original image underlying the 2D lines will have to guess the true 2D position of each underlying image feature along each 2D line. In general, there will be a prohibitively large number of potential solutions, mitigating the risk that the two-dimensional positions of the original image features can be recovered. As shown, 2D line 610 is included in an obfuscated feature 612, which corresponds to image feature 600. While obfuscated feature 612 maintains the feature descriptor 602 that describes image feature 600, the 2D position 604, scale 606, and orientation 608 of the image feature are not included in the obfuscated feature.

In some examples, the 2D direction for each of the 2D lines associated with the obfuscated features may be selected from a predetermined number of different 2D directions. Any suitable predetermined number of directions may be established and utilized. For example, 100 different directions may be predetermined and stored by a camera device. Each of the obfuscated feature lines may be randomly orientated with one of the 100 different directions. In another example, a random direction may be chosen from 256 predetermined directions, such that the direction of each feature line may be expressed as an 8-bit value. In general, however, any number of potential random directions may be established and selected from.

Returning again to FIG. 2, at 208, method 200 includes transmitting an obfuscated image representation to a remote device. As will be described in more detail below, the remote device will have previously acquired a 3D map of the physical environment including a plurality of 3D map features. By determining correspondences between the obfuscated features and the plurality of 3D map features, the remote device may estimate a pose of the camera.

The obfuscated image representation includes the plurality of obfuscated features, which include the 2D lines and feature descriptors described above. Notably, as shown in FIG. 6C, the obfuscated image representation does not include the two-dimensional pixel locations of the image features detected in the original image. For instance, when the image features are SIFT features, the obfuscated image representation may not include the two-dimensional positions, scales, or orientations of the SIFT keypoints. This may make it substantially more difficult, if not impossible, for the remote device or an intercepting party to recreate the original image from the obfuscated image representation.

This is schematically illustrated in FIG. 3, as camera device 300 includes an obfuscated image representation 311, which in turn includes a plurality of obfuscated features 312. Each obfuscated feature includes a 2D line 314 and a feature descriptor 316. This information may be stored by the camera device in any suitable way. As discussed above, the feature vectors will in general include a set of numbers each corresponding to a different dimension. A SIFT feature descriptor will include 128 such numbers. The 2D lines, meanwhile, may be mathematically expressed in various suitable ways, including in the generalized form $ax+by+c=0$. In this manner, each 2D line may be expressed using three values (e.g., a, b, c from the above equation), which may define a line relative to an image. For example, relative to the original, unobfuscated image, a center pixel may be established as the origin, and the horizontal and vertical directions associated with the x and y axes, with the 2D lines defined relative to the origin.

Furthermore, as will be discussed in more detail below, in some cases it may be desirable to further obfuscate the image features prior to transmission of the obfuscated image representation. Thus, for each of the feature descriptors in the obfuscated image representation, the camera device may apply a randomly selected permutation from a set of predefined permutations that is known to both the camera device and remote device. When the feature descriptors are multi-dimensional vectors, applying a permutation may include applying any of a set of predefined modifications to one or more of the values defining the vector. This may provide an additional defense against attempts by the remote device or a malicious actor to infer private information from an obfuscated image representation.

Communication between the camera device and remote device may be achieved in any suitable way. As examples, the camera device and remote device may be communicatively coupled using a wired connection or may employ a wireless connection via Wi-Fi, Bluetooth, or any other suitable wireless communication protocol. The network 320 may take the form of a local area network (LAN), wide area network (WAN), wired network, wireless network, personal area network, cellular network, or a combination thereof, and may include the Internet.

Returning again to FIG. 2, at 210, method 200 includes receiving, from the remote device, a pose of the camera within the physical environment estimated by the remote device. This may be done by determining correspondences between the obfuscated features and the plurality of 3D map features maintained by the remote device, as will be discussed in more detail below. In FIG. 3, camera device 300 receives an estimated pose 318 from remote device 350 via network 320.

Turning now to FIG. 7, an example method 700 for estimating camera pose is illustrated. Method 700 includes steps performed by the remote device (e.g., remote device 350). As with method 200, method 700 may be performed by any suitable computer hardware. In different examples, the remote device may take the form of a server, networking computer, gaming console, mobile communication device, desktop computer, laptop computer, tablet computer, set-top box (e.g. cable television box, satellite television box), or any other type of suitable computing device. The remote device may be implemented as computing system 1200 described below with respect to FIG. 12.

At 702, method 700 includes recognizing a 3D map of a physical environment including a plurality of 3D map features representing the physical environment. In some examples, the 3D map features may take the form of a 3D point cloud representing a reconstruction of the environment. As will be discussed in more detail below, in some cases the 3D map of the environment may itself be obfuscated. The 3D map may include any suitable number of points—in some examples, a 3D point cloud may include 20,000, 30,000 or more 3D points that denote various locations on surfaces within the physical environment.

Such a 3D map may be generated in any suitable way. In general, a physical environment will be mapped using a suitable imaging device that captures a plurality of images or videos of the physical environment from different positions. These images may be grayscale images, color images, depth images, etc. Image features may be detected in each image, as discussed above. By detecting image features that are common to more than one of the captured images, the spatial relationship between the images may be determined. The distance between each image feature and the imaging system may be inferred from the observed parallax shift when the same image feature is detected in multiple images captured from different positions. Additionally, or alternatively, depth information from a depth camera may be used to identify the dimensions of the physical environment and the distances between the imaging system and each image feature. In some implementations, the pose of the imaging system may be tracked as it captures the plurality of images, providing additional information that can be used to stitch the plurality of images into a 3D representation of the physical environment.

As noted above, each of the 3D points are associated with feature descriptors extracted from the source images that are used to construct the 3D map. A feature descriptor may comprise a multi-dimensional vector that encodes the appearance of a surface around a 3D point. For example, an image patch (such as 32×32 pixels) around a given pixel of a 3D point may encode the appearance of a surface around that point into a feature descriptor that is more compact.

Feature descriptors need not be generated at every 3D pixel of a 3D point cloud. In some examples, feature descriptors may be selectively generated at distinguishing features of the map, such as corners, highly textured areas, etc. In this manner, feature descriptors of obfuscated features in an obfuscated image representation may be more easily matched with corresponding 3D map features in the 3D map. Additionally, in some examples an initially-generated point cloud may be decimated to reduce the density of 3D points included in the cloud. For example, a subset of representative 3D points may be selected in the point cloud, and non-selected 3D points within a predetermined distance of the selected 3D points may be discarded. In this manner, the resulting decimated 3D point cloud may be more quickly loaded and more easily processed by the remote device.

As used in FIG. 7, a 3D map of a physical environment may be "recognized" in any suitable manner. In general, recognizing a 3D map includes loading the map into memory of the remote device such that processing (e.g., camera pose estimation) may be done. The 3D map may be stored on the remote device, retrieved from a remote source, partially or entirely generated on-the-fly, etc.

Turning briefly to FIG. 3, remote device 350 includes a logic machine 352 and a storage machine 354 holding instructions executable by the logic machine to perform various computing tasks. Storage machine 354 includes a 3D map 356 of a physical environment. The 3D map includes a plurality of 3D map features 358. In turn, each 3D map feature includes a 3D point 360 (i.e., the 3D position of the map feature within the 3D map), and a 3D point feature descriptor 362. Logic machine 352 and storage machine 354 may be implemented using any suitable data processing and data storage technologies, respectively. Additional details regarding the logic machine and storage machine are provided below with respect to FIG. 12.

Returning to FIG. 7, at 704, method 700 includes receiving an obfuscated image representation derived from an image of the physical environment. This may be done substantially as described above with respect to FIG. 2. In FIG. 3, remote device 350 receives obfuscated image representation 311 from camera device 300 over network 320. Representation 311 still includes the plurality of obfuscated features 312, including the 2D lines 314 and feature descriptors 316.

Turning again to FIG. 7, at 706, method 700 includes determining correspondences between obfuscated features in the obfuscated image representation and 3D map features in the 3D map of the physical environment. One example procedure for determining such correspondences is given herein, although numerous variations and alternative procedures are possible.

In general, the remote device identifies correspondences between the 2D lines in the obfuscated features and the 3D points of the 3D map features. This is done by searching the 3D map for the feature descriptors associated with each obfuscated feature and identifying the 3D map features having the most similar feature descriptors in the 3D point cloud. In other words, determining the correspondences may include identifying a set of obfuscated features having feature descriptors that match feature descriptors of 3D map features in the 3D map. As a result, the 2D line of each obfuscated feature in the set corresponds to a 3D point associated with a 3D map feature, giving a set of 2D line to 3D point correspondences. This feature descriptor matching step can be implemented using one of many nearest neighbor matching techniques. The L2-distance between the descriptor vectors may be used to calculate the pairwise feature similarity.

Notably, not all of the determined correspondences are necessarily correct. In practice, some number of incorrect correspondences may be determined. This is because the underlying feature descriptors can be ambiguous and do not always allow sufficient discrimination between a feature descriptor of an obfuscated feature and multiple feature descriptors associated with 3D points in the map.

The image of the physical environment may include items, objects, people, etc., that were not present when the physical environment was mapped. Thus, one or more image features may be detected in the image that are not represented in the 3D map of the physical environment. Typically, such obfuscated features will not correspond to any 3D points in the map. This may be advantageous in some scenarios, as any private details depicted in the image will likely not correspond to any 3D map features in the 3D map, thus limiting the amount of information that the remote device can infer about the private details. There may also be some number of 3D points in the map that do not match any of the obfuscated features in the obfuscated image representation.

Determining correspondences between obfuscated features and 3D map features is illustrated with respect to FIGS.

8A-8C. With regard to FIG. 8A, an image plane 800 is shown, including a single 2D line 802. 2D line 802 is associated with an obfuscated feature that corresponds to a 3D map feature in a 3D map of a physical environment.

The 2D lines associated with the obfuscated features can be thought of as the projection of a unique 3D plane that originates from the camera projection center and passes through the 2D line. Put another way, each 3D plane represents a back-projection of a 2D line into 3D space in the camera coordinate system. This is illustrated in FIG. 8B, which shows image plane 800 and 2D line 802 from another angle. As shown, 2D line 802 has been back projected into the 3D space as a 3D plane 806, which originates from a camera projection center 804.

Each correspondence between a 2D line and a 3D point in the 3D map provides one constraint on the camera pose solution space. This is because, given the correct camera pose in the 3D map coordinate system, the back-projected 3D plane for a 2D line must pass through the 3D point in the map associated with a 3D map feature that corresponds to the 2D line's obfuscated feature. Thus, a single correspondence between a 2D line and a 3D point represents a nonlinear constraint on the six unknown variables that correspond to the six degree of freedom camera pose. Depending on the specific algorithm used, in order to compute the camera pose, six such correspondences, and therefore six constraints, may be used. The six constraints can be written in the form of a system of multivariate polynomial equations in six variables. In one example, when six 3D plane to 3D point correspondences are known, a minimal solver may calculate a set of eight candidate camera poses by solving an algorithm that outputs pose solutions based on 3D plane to 3D point correspondences. This may be done in a similar manner as that described in A minimal solution for registration of 3D points to 3D planes, Ramalingam et al., 2010, with the exception that Cayley Parameterization may be used for the 3D rotation matrices, which results in a set of polynomial equations having fewer solutions.

Figure 8C:
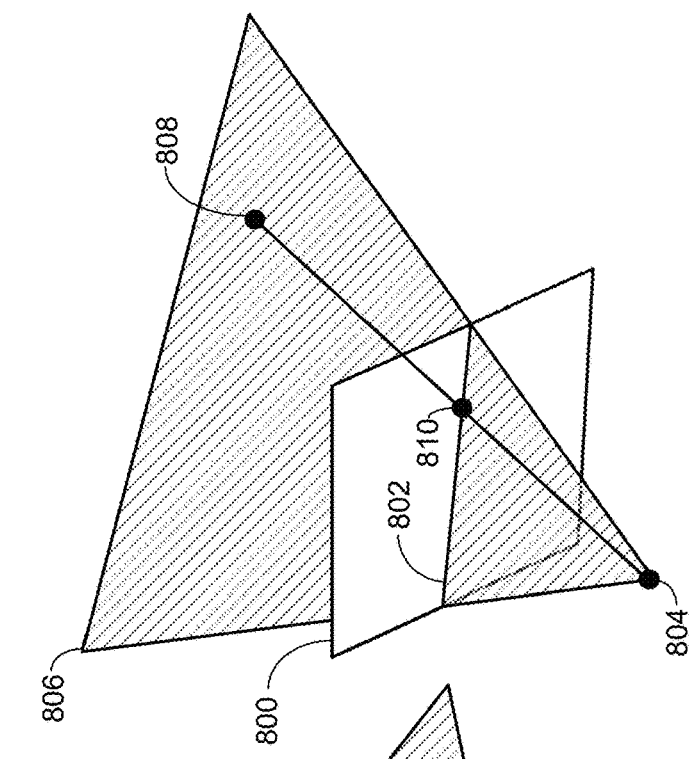
FIGS. 8A, 8B, and 8C illustrate determination of correspondences between obfuscated features and 3D map features.
Figure 8B:
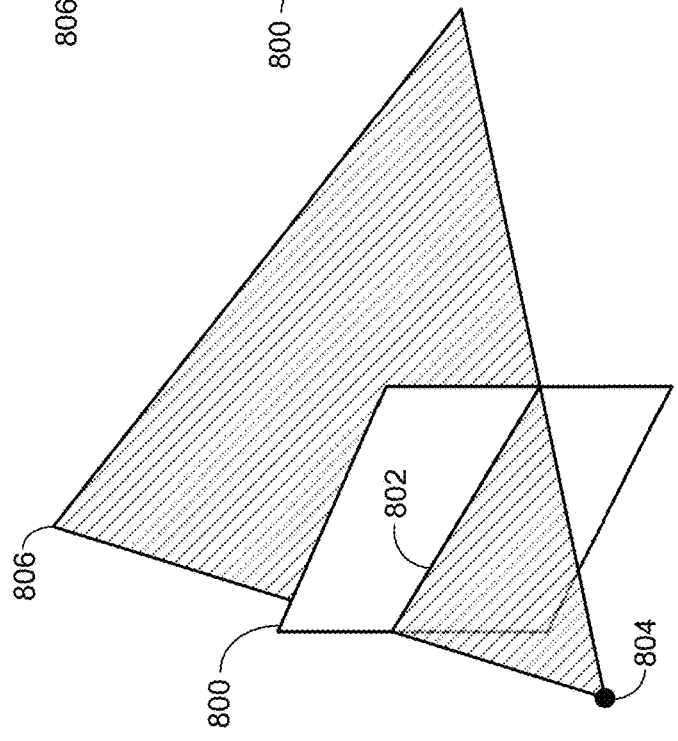
Figure 8A:
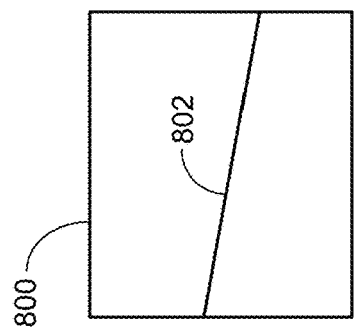

In FIG. 8C, a black dot corresponding to a 3D map feature 808 is shown in the 3D map space beyond image plane 800. 3D plane 806 will pass through both 2D line 802 and 3D map feature 808 when the camera projection center 804 represents the actual camera pose. In FIG. 8C, 3D map feature 808 has been resolved to a position 810 along 2D line 802. Assuming the camera projection center corresponds to the actual camera pose, then 2D position 810 may denote the 2D position of an image feature detected within the original image.

As noted above, not every 2D line in the obfuscated image representation will necessarily have a corresponding 3D map feature in the 3D map. Similarly, not every 3D map feature will have a corresponding obfuscated feature. This may be advantageous in some scenarios, as any private information included in the image (e.g., faces, personal objects) that were not present when the physical environment was mapped will not correspond to 3D map features. In a specific scenario, image features detected in image 100 associated with structure 104 may be relatively likely to have corresponding 3D map features in the 3D map. Thus, the camera pose relative to the structure may be determined. However, image features that correspond to user 106 will not have corresponding 3D map features, as the user was likely not at the depicted position when the physical environment was mapped.

Figure 9B:
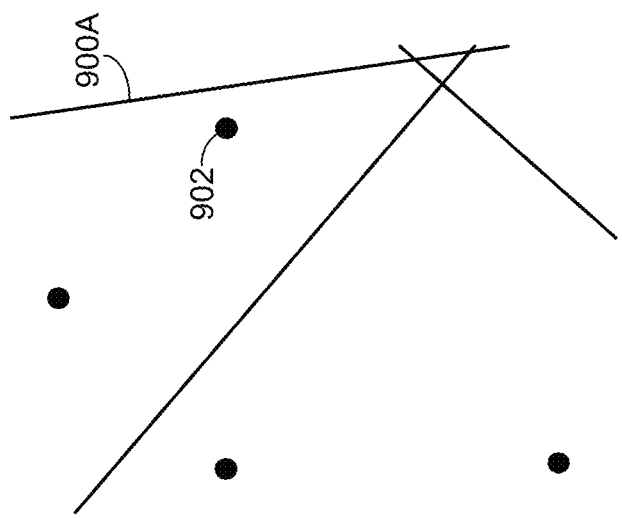
FIGS. 9A and 9B illustrate correspondences between obfuscated features and 3D map features.
Figure 9A:
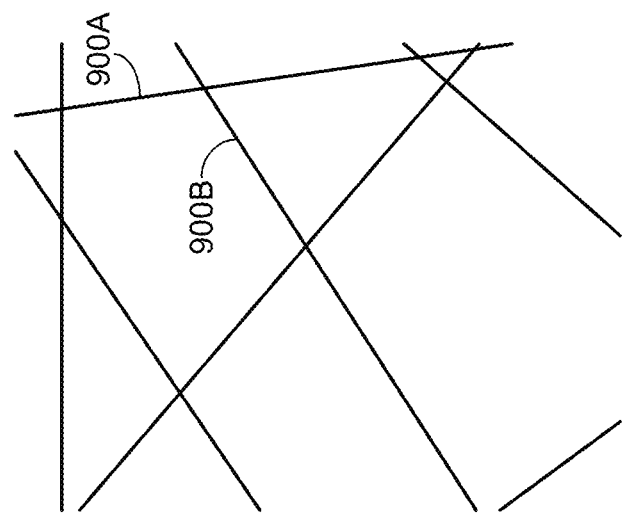

This is illustrated in FIGS. 9A and 9B. FIG. 9A reproduces the set of 2D lines shown in FIG. 6C. In FIG. 9A, two of these lines have been labeled as 900A and 900B. In FIG. 9B, correspondences have been determined between several of the 2D lines and 3D map features in a 3D map of a physical environment. As such, several of the 2D lines have been resolved to the 2D positions at which image features were detected in the original image. In this case, all of the resolved 2D lines give image features that were detected on the structure 104, including 2D line 900B, which has been localized to a 2D position 902. However, 2D line 900A corresponds to an image feature associated with user 106, and as such does not have a corresponding 3D map feature in the 3D map. The remote device is therefore unable to identify the 2D position of the image features that 2D line 900A passes through, meaning the remote device is unable to infer details regarding the appearance of user 106.

Returning briefly to FIG. 7, at 708, method 700 includes estimating a pose of the camera in the physical environment based on the determined correspondences between the obfuscated features 3D map features. Estimating the camera pose may be an iterative randomized process, in which correspondences between 2D lines and 3D points are identified for a plurality of candidate camera poses, and these candidate camera poses are evaluated for their consistency with the underlying correspondence data. In one example procedure, the pose of the camera may be estimated from the determined correspondences using a random sample consensus (RANSAC) method. In such cases, a minimal or non-minimal solver may be used to calculate a plurality of candidate camera poses from subsets of the determined correspondences. However, it will be understood that other suitable approaches may be used to estimate the camera pose that do not use a RANSAC framework.

Figure 10:
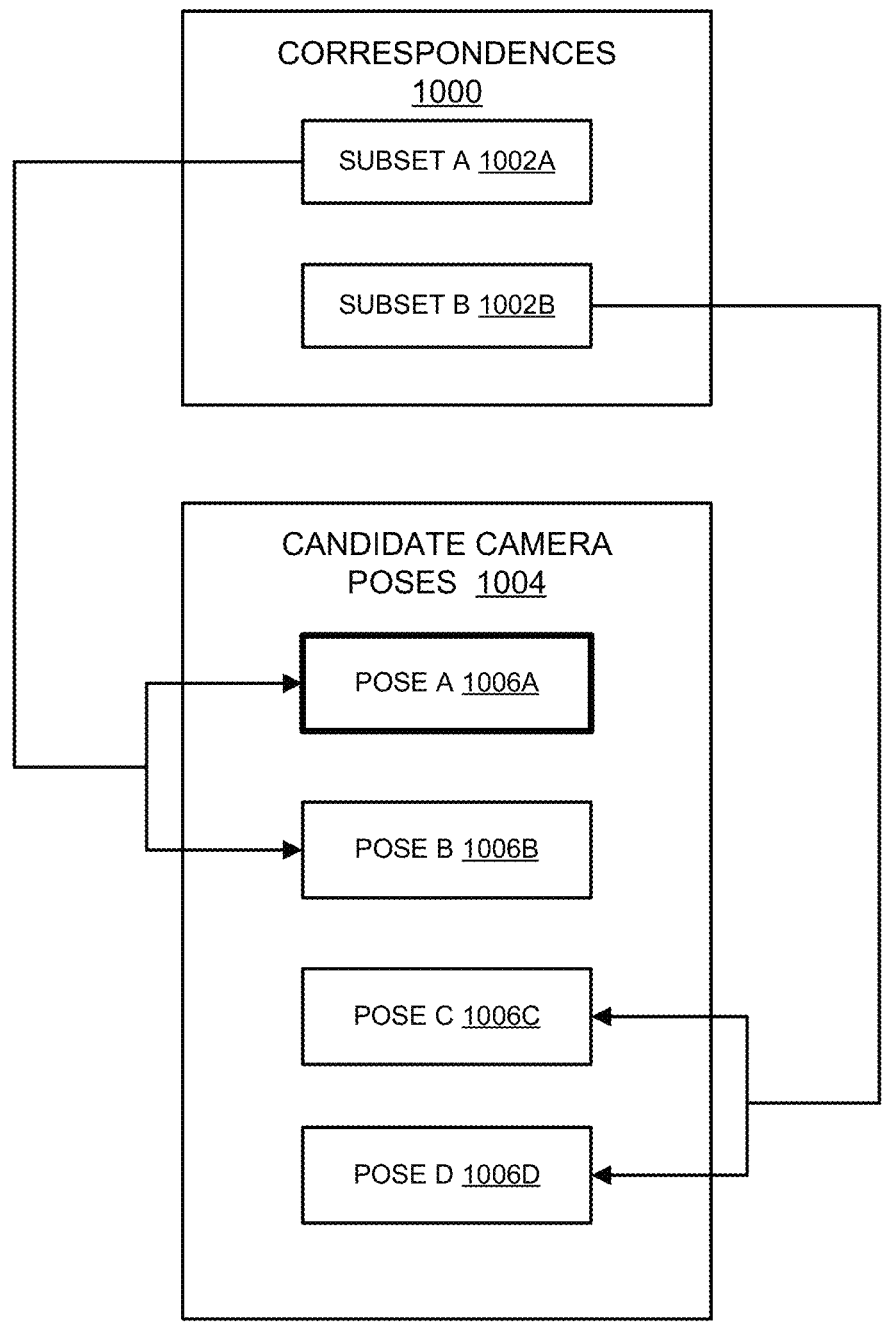
FIG. 10 illustrates estimation of a camera pose based on determined correspondences.

To begin, the remote device may identify a subset of correspondences from the overall set of determined 2D line to 3D point correspondences. This is schematically shown in FIG. 10, which includes the set of all correspondences 1000 identified as described above. Correspondences 1000 include a first subset 1002A and a second subset 1002B, which may each have any suitable number of 2D line to 3D point correspondences.

In some cases, the number of correspondences in the identified subset may correspond to a minimal number of data points necessary to calculate a finite number of solutions using a method known as a minimal solver. For instance, when fitting a 2D line to 2D points, a minimum of two unique data points are needed to find a unique 2D line (single solution) that exactly passes through the 2D points. A single data point, on the other hand, could be consistent with an infinite number of potential solutions. Thus, for this line fitting toy example, two data points are the minimum number required for a minimal solver. A non-minimal solver, by contrast, may use more than two data points.

Continuing with the 2D line fitting example, a plurality of subsets of 2D data point pairs may be selected. In a RANSAC framework, these subsets are selected at random. If the minimal solver is applied to each subset (i.e., pair of 2D points), different potential solutions may be found from each subset. However, some potential solutions (2D lines) will be more consistent with the input data than other potential solutions. In other words, some potential lines will pass through more 2D points in the dataset than others. In RANSAC, for each potential solution identified by a minimal solver, the solution (i.e., 2D line) is compared to other 2D data points in the dataset to determine which points are consistent with the proposed solution (i.e., "inliers") vs which points are not consistent with the proposed solution (i.e., "outliers"). Any solution that has the highest inlier to outlier ratio, or has at least a threshold number of total inliers, may be accepted as the actual solution—e.g., 2D the line that best fits the set of 2D points.

Returning to the camera pose estimation problem, depending on the information available, a minimal solver may output a finite number of solutions or potential pose candidates from a minimal subset of determined correspondences. In other words, for each identified subset of correspondences, the remote device may calculate a set of candidate camera poses that satisfy the subset of correspondences. For instance, when the subset of correspondences includes six 2D line to 3D point correspondences, a minimal solver may output sixteen candidate camera poses. This 6-pt solver may be implemented by solving a system of polynomial equations using Grobner basis techniques. Examples of such techniques are described in *A minimal solution for registration of 3D points to 3D planes*, Ramalingam et al., 2010, and *A theory of minimal 3D point to 3D plane registration and its generalization*, Ramalingam and Taguchi, 2013. As shown in FIG. 10, a set of candidate camera poses 1004 are identified from subsets 1002A and 1002B. The first subset of correspondences 1002A gives two candidate camera poses 1006A and 1006B, while the second subset 1002B gives another two camera pose candidates 1006C and 1006D.

As an alternative to the 6-pt minimal solver, a linear pose estimation approach may be used that relies on twelve 2D line to 3D point correspondences and outputs only a single solution, or candidate camera pose. Even though this approach may involve additional RANSAC iterations as compared to the approach that uses the 6-pt minimal solver, each iteration may be more computationally efficient, thereby reducing the overall processing time. An example of a suitable linear pose estimation approach is described in *Direct 6-DoF Pose Estimation from Point-Plane Correspondences*, Khoshelham, 2015.

The number of correspondences required for the minimal solver may in some cases be reduced when some information about the camera's pose is already known. For instance, when capturing the image of the physical environment, the camera device may detect a gravity vector relative to its current pose (e.g., via onboard 3-axis accelerometer). This gravity vector may in some cases be included in the obfuscated image representation along with the 2D lines and the associated feature descriptors. Thus, two degrees of freedom of the camera's 3D orientation (corresponding to roll and pitch) may already be known, reducing the complexity of estimating the remaining degrees of freedom. For instance, when the gravity vector is known, a linear pose estimation approach similar to the one described above may require only five correspondences and output a single solution, or candidate camera pose estimated based on the known gravity vector. Similarly, a 4-pt minimal solver may require only four correspondences and output two candidate camera poses.

Once candidate camera poses are calculated for each subset of correspondences, the remote device may identify a best overall camera pose from the set of every candidate camera pose. In other words, several camera pose hypotheses are identified by the remote device, at least one of which is likely to correspond to the actual pose of the camera.

In FIG. 10, pose A 1002A has been identified as the best overall camera pose. In general, the best overall camera pose will be more consistent than other candidate camera poses with the overall set of correspondences. In other words, the remote device may determine, for each candidate camera pose, how many of the determined correspondences would be inliers and how many would be outliers, and the candidate subset-consistent camera pose may be identified on this basis.

For instance, the remote device may assign a RANSAC score to each candidate camera pose by evaluating an objective function that projects the points into a hypothetical image plane within the 3D map of the physical environment, where the projection is based on the candidate camera pose being tested. Given the correspondences between the obfuscated features and 3D points, the geometric error (e.g., in pixels) may be measured by computing the distance between each 2D line a corresponding 2D point obtained by projecting a 3D map feature's 3D point onto the hypothetical image plane. Candidate camera poses having smaller average geometric error are preferred, and the candidate camera pose having the smallest geometric error may be identified as the best overall camera pose.

The description has thus far focused on a scenario in which the camera captures a single image of the physical environment. From this single image, the camera device derives an obfuscated image representation, which is transmitted to the remote device and used to estimate the pose of the camera. However, in alternate implementations, the camera may capture two or more images of the physical environment, and an obfuscated 3D local map may be derived from the two or more images. Alternatively, two or more images may be captured at the same time by two or more cameras—for instance, in the case of a multi-camera (e.g., stereoscopic) device. The remote device may therefore estimate a current pose of the camera that corresponds to the camera pose when the most recent image was captured. Additionally, or alternatively, the remote device may estimate camera poses for each of the captured images, a range of poses that depict the camera's movements throughout the physical environment as the images were taken, a single pose consistent with both images (i.e., in multi-camera implementations), etc. As used herein, a "3D local map" refers to a 3D representation of the camera device's local environment that is generated by the camera device based on images taken by the camera(s). The 3D local map is different from the 3D map of the physical environment maintained by the remote device.

Figure 11A:
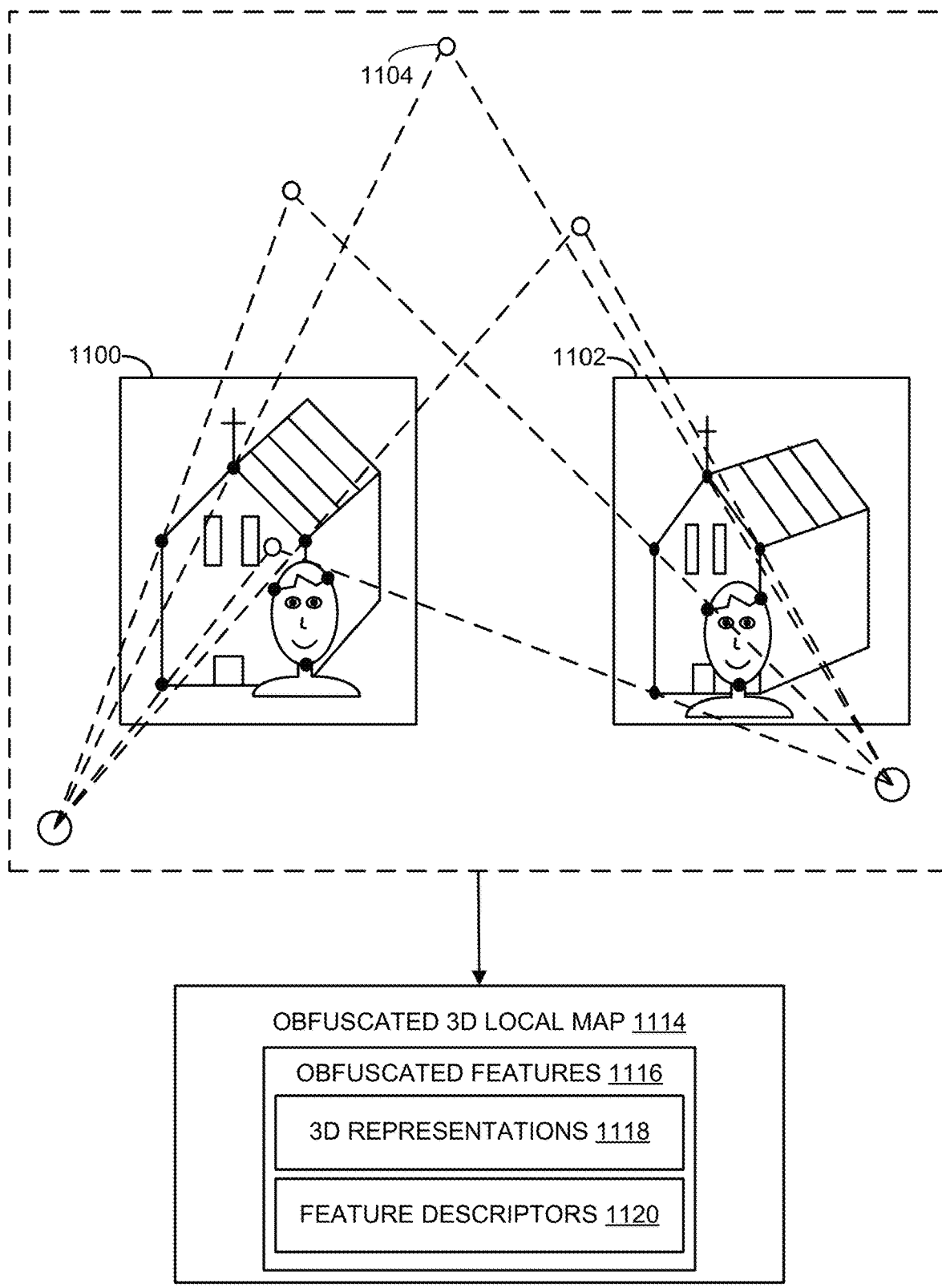

A multi-image scenario is illustrated in FIG. 11A, which shows two different images 1100 and 1102 captured of physical environment 102. A plurality of image features have been identified in each image, the positions of which are again denoted by black dots. Notably, however, the two images were captured from different perspectives. The remote device may therefore first identify 2D feature point correspondences between the two captured images to generate a 3D local map. Such correspondences may be identified by finding image features in the two or more images having matching or highly similar feature descriptors and localizing the image features to 3D points via triangulation. In FIG. 11A, dashed lines are shown extending from camera projection centers and through the black dots corresponding to the 2D image features. The dashed lines converge at 3D points, one of which is labeled as 1104, which denote the 3D locations corresponding to the multiple image features—i.e., as 3D points distributed throughout the 3D local map.

The 3D local map will be limited to the portions of the physical environment visible in the two or more images and may therefore be less detailed than the 3D map of the physical environment used by the remote device. Furthermore, the 3D local map may use a different coordinate system than the remote 3D map of the physical environment.

The 3D local map may be computed from the two or more captured images in any suitable way. Typically, the camera device will detect and match image features that depict common scene points in the two or more images. A 3D point cloud reconstruction of the physical environment may be inferred by observing the relative positions of each image feature in each captured image, the extent to which each image feature moves as the camera pose changes (e.g., due to parallax), via geometric triangulation, additional information (e.g., depth information) available to the camera device, etc.

Once generated, the 3D local map includes a 3D point cloud, each of the 3D points having an associated feature descriptor calculated from image features detected in the images used to build the 3D local map. This is shown in FIG. 11B, which shows the 3D points triangulated from images 1100 and 1102. One such 3D point 1104 includes a feature descriptor 1106 and a 3D position coordinates 1108, which may be defined relative to a coordinate system of the 3D local map. The feature descriptor 1106 of the 3D point may be the same as a feature descriptor that describes one of the 2D image features detected in the two or more images from which the 3D local map was derived.

From this, the camera device may derive an obfuscated 3D local map that includes a plurality of obfuscated features. Similar to the obfuscated features included in the obfuscated image representation described above, the obfuscated features in the obfuscated 3D local map may include 3D feature representations that replace the 3D points in the unobfuscated 3D local map, as well as feature descriptors describing the appearance of the 3D point that was replaced.

The 3D feature representations in the obfuscated features may take the form of 3D lines, and each 3D line may optionally have a random three-dimensional direction. This is shown in FIG. 11C, in which 3D lines passing through the 3D points of the 3D local map are depicted. In FIG. 11D, the 3D points are no longer included and instead have been replaced entirely by obfuscated features, one of which is labeled as obfuscated feature 1110. As shown, obfuscated feature 1110 includes a 3D line 1112 and still includes feature descriptor 1106, which describes a 2D image feature detected in the two or more images from which the 3D point replaced by the 3D line was calculated.

As an alternative, the 3D feature representations in the obfuscated features may take the form of 3D planes that pass through the 3D points corresponding to the image features, and each 3D plane may have a random 3D direction.

Turning again to FIG. 11A, images 1100 and 1102 are used to generate an obfuscated 3D local map 1114. This includes a plurality of obfuscated features 1116, which include 3D feature representations 1118 and feature descriptors 1120. As discussed above, the 3D feature representations may be implemented as 3D lines or 3D planes. Notably, the obfuscated 3D local map may exclude the original 3D positions of the 3D points corresponding to image features detected in the two or more images used to build the 3D local map. The obfuscated 3D local map may, however, include any additional information that may facilitate estimation of the camera pose or camera poses. This may include, for example, an indication of a gravity vector detected by the camera device when the two or more images were captured.

Once transmitted to the remote device, the obfuscated 3D local map may be used to estimate a camera pose based on determined correspondences between 3D feature representations in the obfuscated 3D local map and 3D points in the 3D map of the physical environment. This generally involves finding the 3D rigid body transformation between coordinate systems of the obfuscated 3D local map and the 3D map of the physical environment. The details, however, may be substantially similar to the pose estimation approaches described above with respect to the obfuscated image representation. For example, in the case where the obfuscated 3D local map includes 3D planes, then six 3D plane to 3D point correspondences may used by a 6-pt minimal solver to output sixteen potential 3D rigid body transformations. From these transformations, the camera pose or camera poses may be estimated. Alternatively, when the obfuscated 3D local map includes 3D lines, then a set of three 3D line to 3D point correspondences may be used to estimate the 3D rigid body coordinate transformation. This may be described as a generalized absolute camera pose problem. An example approach is described in *A Minimal Solution to the Generalized* 3-*Point Pose Problem*, Nister and Stewenius, 2003. When the gravity vector detected by the camera is included in the obfuscated environment representation, then the 3D rigid body transformation may be estimated using only two 3D line to 3D point correspondences.

Theoretically, the obfuscated 3D local map can have any arbitrary scale and need not have the same scale as the 3D map of the physical environment used by the remote device. This can complicate efforts to calculate the camera pose unless the relative scale factor is known. However, these issues may be alleviated when the 3D local environment map and 3D map of the physical environment used by the remote device are generated using visual inertial simultaneous localization and mapping (VI+SLAM) techniques, or using SLAM with one or more stereo cameras, which reconstruct the world in true dimensions. In such implementations, the obfuscated environment representation will have the same scale as the 3D map of the physical environment.

The description thus far has focused on a case in which the 3D map of the physical environment includes discrete 3D points distributed throughout the 3D map. In alternative scenarios, however, the 3D map of the physical environment may itself be obfuscated. This may be done, for example, to prevent anyone who obtains the 3D map of the physical environment from recreating the original images used to generate the map, as discussed above. To this end, the 3D points in the 3D map of the physical environment may optionally be obfuscated by replacing them with 3D lines each having a random direction. Notably, the 3D lines are selected in such a way that they pass through the 3D points in an original, unobfuscated version of the 3D map, even though the obfuscated 3D map may not include the actual 3D coordinates of the 3D points. When compared to an obfuscated 3D local map derived from one or more images of the physical environment, a RANSAC based approach for determining the 3D rigid body transformation between the local map and the original 3D map may require a generalized relative pose solver that, when provided with six 3D line to 3D line correspondences outputs 64 candidate solutions for the relative 3D rigid body transformation between the coordinate systems of the local map and the original 3D map. An example approach is described in *Solutions to Minimal Generalized Relative Pose Problems*, Stewenius et al., 2005. When the gravity vector is known, a different minimal solver provided with 4 3D line to 3D line correspondences may output eight candidate camera poses. Using both a confidential query and a confidential map potentially enables an untrusted third party to perform localization computations and/or enables localization computations to be performed on non-secure hardware while guaranteeing privacy of both the map and the query (e.g., in scenarios where the maps are exported to a compute device that is spatially close to the physical location of the mapped site, but not necessarily fully secure).

As discussed above, when determining correspondences between obfuscated features and 3D map features, any feature representations (e.g., 2D lines, 3D lines, 3D planes) corresponding to items, objects, people, etc., not present in the physical environment during mapping will not have corresponding 3D map features in the 3D map of the physical environment. Thus, the positions of the image features represented by the obfuscated representations, whether they are in a 2D obfuscated image representation or an obfuscated 3D local map, will not be revealed. However, the remote device could potentially store any unmatched obfuscated features in a database. As additional obfuscated features are received and additional unmatched obfuscated features are stored, the remote device may eventually be able to determine correspondences between the various unmatched obfuscated features, potentially allowing the remote device to infer the positions or appearances of any objects in the images associated with the obfuscated features. Though this is typically not feasible with objects that move within the physical environment as the images are taken (e.g., people), the appearances of stationary objects may in some cases be revealed. This problem may be exacerbated when the camera device transmits an obfuscated 3D local map based on two or more images.

To address this, the feature descriptors transmitted with the obfuscated features may in some cases be modified. As discussed above, the transmitted feature descriptors may be, for example, 128-dimensional SIFT vectors. Both the camera device and remote device may maintain a known set of predefined permutations that can be applied to the feature vectors. Each time the camera device transmits an obfuscated image representation to the remote device, the camera device may randomly apply any of these potential permutations to the included feature descriptors without notifying the remote device of which permutations were selected. In other words, for each of the feature descriptors, the camera device may apply a randomly-selected permutation from a known set of predetermined permutations to the feature descriptor prior to transmitting the obfuscated image representation to the remote device.

Once the remote device receives the obfuscated image representation, the remote device may apply each of the predefined permutations to each of the received feature descriptors, thus creating a plurality of permuted descriptor copies for each feature descriptor. The remote device may then search for correspondences between the permuted descriptor copies and the 3D map features. For image features that are present in both the captured image and 3D map of the physical environment, at least one permuted copy of the feature descriptor is likely to give a strong feature match—i.e., the permuted descriptor copy will match the 3D map feature with at least a threshold similarity. Therefore, the correspondence can still be determined, which allows the camera pose to still be estimated as described above. However, for obfuscated features that do not have corresponding 3D map features in the 3D map, it is unlikely that any of the permuted versions of the associated feature descriptor will result in a strong feature match. Furthermore, even if the unmatched obfuscated features are stored by the remote device as discussed above, each stored version of the obfuscated feature line will likely have a different permutation, thus making it significantly more difficult for the remote device to infer the true feature descriptors and thereby reveal private information.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 12 schematically shows a non-limiting embodiment of a computing system 1200 that can enact one or more of the methods and processes described above. Computing system 1200 is shown in simplified form. Either or both of camera device 300 and remote device 350 may be implemented as computing system 1200. Computing system 1200 may take the form of one or more HMDs, personal computers, server computers, tablet computers, home-entertainment computers, network computing devices, gaming devices, mobile computing devices, mobile communication devices (e.g., smart phone), and/or other computing devices.

Computing system 1200 includes a logic machine 1202 and a storage machine 1204. Computing system 1200 may optionally include a display subsystem 1206, input subsystem 1208, communication subsystem 1210, and/or other components not shown in FIG. 12.

Logic machine 1202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1204 includes one or more physical devices configured to hold instructions executable by the logic machine to implement the methods and processes described herein. When such methods and processes are implemented, the state of storage machine 1204 may be transformed—e.g., to hold different data.

Storage machine 1204 may include removable and/or built-in devices. Storage machine 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1204 may include volatile, nonvolatile, dynamic, static, read/write, read-only, random-access, sequential-access, location-addressable, file-addressable, and/or content-addressable devices.

It will be appreciated that storage machine 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1202 and storage machine 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 implemented to perform a particular function. In some cases, a module, program, or engine may be instantiated via logic machine 1202 executing instructions held by storage machine 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1206 may be used to present a visual representation of data held by storage machine 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. Such display devices may be combined with logic machine 1202 and/or storage machine 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

In an example, a method for estimating a camera pose comprises: recognizing a three-dimensional (3D) map representing a physical environment, the 3D map including a plurality of 3D map features defined at a plurality of 3D points distributed throughout the 3D map; receiving an obfuscated image representation derived from an original unobfuscated image of the physical environment captured by a camera, the obfuscated image representation including a plurality of obfuscated features, and each obfuscated feature including (i) a two-dimensional (2D) line that passes through a 2D point in the original unobfuscated image at which an image feature was detected, and (ii) a feature descriptor associated with the 2D point that describes the image feature that the 2D line of the obfuscated feature passes through; determining correspondences between the obfuscated features in the obfuscated image representation and 3D map features in the 3D map; and based on the determined correspondences, estimating a six degree of freedom pose of the camera in the physical environment. In this or any other example, determining the correspondences includes identifying a set of obfuscated features having feature descriptors that match feature descriptors of 3D map features in the 3D map, such that the 2D line of each obfuscated feature in the set corresponds to a 3D point associated with a 3D map feature giving a set of 2D line to 3D point correspondences. In this or any other example, based on the determined 2D line to 3D point correspondences, the pose of the camera is estimated using a random sample consensus (RANSAC) framework and a minimal or non-minimal solver to calculate a plurality of candidate camera poses from subsets of the determined 2D line to 3D point correspondences. In this or any other example, estimating the pose of the camera includes: identifying a subset of the determined 2D line to 3D point correspondences; and identifying one or more candidate camera poses consistent with the subset of the determined 2D line to 3D point correspondences. In this or any other example, estimating the pose of the camera further includes identifying additional subsets of the determined 2D line to 3D point correspondences, identifying one or more additional candidate camera poses for each of the additional subsets of 2D line to 3D point correspondences, and identifying a best overall camera pose from the candidate camera poses. In this or any other example, each subset of correspondences includes six 2D line to 3D point correspondences, and each set of candidate camera poses includes sixteen candidate camera poses. In this or any other example, each subset of correspondences includes six 2D line to 3D point correspondences, each 2D line is back-projected as a 3D plane in a camera coordinate system, and a minimal solver calculates a set of eight candidate camera poses by solving an algorithm that outputs pose solutions based on 3D plane to 3D point correspondences. In this or any other example, each subset of correspondences includes twelve 2D line to 3D point correspondences, and each set of candidate camera poses includes a single candidate camera pose. In this or any other example, the obfuscated image representation includes an indication of a gravity vector detected when the original unobfuscated image was captured, each subset of correspondences includes five 2D line to 3D point correspondences, and each set of candidate camera poses includes a single candidate camera pose calculated based on the gravity vector. In this or any other example, a feature descriptor in the obfuscated image representation is a permuted feature descriptor that has been modified with a permutation randomly-selected from a known set of predefined permutations, and the method further comprises applying each permutation of the known set of predefined permutations to the permuted feature descriptor to create a plurality of permuted descriptor copies, searching for correspondences between each permuted descriptor copy and the plurality of 3D map features, and determining a correspondence between the feature descriptor and a 3D map feature if a permuted descriptor copy has at least a threshold similarity to the 3D map feature.

In an example, a method for estimating a camera pose comprises: via a camera, capturing an image of a physical environment; detecting a plurality of image features at two-dimensional (2D) pixel locations within the image of the physical environment; generating a plurality of obfuscated features corresponding to the plurality of image features, each obfuscated feature including (i) a 2D line passing through the 2D pixel location of a corresponding image feature, and (ii) a feature descriptor that describes the image feature associated with the 2D point that the 2D line of the obfuscated feature passes through; transmitting an obfuscated image representation to a remote device, the obfuscated image representation including the plurality of obfuscated features, the obfuscated image representation not including the 2D pixel locations of the plurality of image features; and receiving, from the remote device, a six degree of freedom pose of the camera within the physical environment estimated by the remote device based on correspondences between the obfuscated features and a plurality of three-dimensional (3D) map features defined at a plurality of 3D points within a 3D map of the physical environment previously acquired by the remote device. In this or any other example, each image feature detected in the image has a (2D) position, a scale, a one-dimensional (1D) angular orientation, and a feature descriptor, and the obfuscated image representation does not include the 2D position, the scale, and the 1D angular orientation of the image feature. In this or any other example, the method further comprises, for each of the feature descriptors, applying a randomly-selected permutation from a predetermined set of permutations to the feature descriptor prior to transmitting the obfuscated image representation to the remote device. In this or any other example, each 2D line has a randomly assigned direction.

In an example, a method for estimating a current camera pose, comprises: recognizing a three-dimensional (3D) map representing a physical environment, the 3D map including a plurality of 3D map features defined at a plurality of 3D points distributed throughout the 3D map; receiving an obfuscated 3D local map derived from two or more images of the physical environment having been captured by two or more cameras, the obfuscated 3D local map including a plurality of obfuscated features each including (i) a 3D feature representation that replaces a 3D point in the unobfuscated 3D local map, the 3D point having been computed based on feature matching and triangulation of 2D image features detected in the two or more images, and (ii) a feature descriptor that describes one of the 2D image features from which the 3D image feature was triangulated; determining correspondences between obfuscated 3D feature representations in the obfuscated 3D local map and 3D point features in the 3D map of the physical environment; and based on the determined obfuscated 3D feature representation to 3D point correspondences, estimating a six degree of freedom pose of the two or more cameras in the physical environment. In this or any other example, the 3D feature representations are 3D lines passing through the 3D points in the original, unobfuscated 3D local map, each 3D line having a random direction, and the determined correspondences include at least three 3D line to 3D point correspondences. In this or any other example, the 3D feature representations are 3D lines each having a random direction, and the 3D map features in the three-dimensional map of the physical environment are obfuscated map features, such that each obfuscated map feature takes the form of a 3D line that has a random direction and that passes through the 3D point of a 3D map feature in an original, unobfuscated version of the 3D map. In this or any other example, the 3D feature representations are 3D planes passing through the 3D points in the original, unobfuscated 3D local map, each 3D plane having a random direction, and the determined correspondences include at least six 3D plane to 3D point correspondences. In this or any other example, the obfuscated 3D local map includes an indication of a gravity vector detected when the two or more images were captured. In this or any other example, the obfuscated 3D local map has a same scale as the 3D map of the physical environment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for estimating a camera pose, comprising:
 recognizing a three-dimensional (3D) map representing a physical environment, the 3D map including a plurality of 3D map features defined at a plurality of 3D points distributed throughout the 3D map;
 receiving an obfuscated image representation derived from an original unobfuscated image of the physical environment captured by a camera, the obfuscated image representation including a plurality of obfuscated features, and each obfuscated feature including (i) a two-dimensional (2D) line that passes through a 2D point in the original unobfuscated image at which an image feature was detected, and (ii) a feature descriptor associated with the 2D point that describes the image feature that the 2D line of the obfuscated feature passes through;
 determining correspondences between the obfuscated features in the obfuscated image representation and the plurality of 3D map features in the 3D map; and
 based on the determined correspondences, estimating a six degree of freedom pose of the camera in the physical environment.

2. The method of claim 1, where determining the correspondences includes identifying a set of obfuscated features having feature descriptors that match feature descriptors of 3D map features in the 3D map, such that the 2D line of each obfuscated feature in the set corresponds to a 3D point associated with a 3D map feature giving a set of 2D line to 3D point correspondences.

3. The method of claim 2, where, based on the determined 2D line to 3D point correspondences, the pose of the camera is estimated using a random sample consensus (RANSAC) framework and a minimal or non-minimal solver to calculate a plurality of candidate camera poses from subsets of the determined 2D line to 3D point correspondences.

4. The method of claim 3, where estimating the pose of the camera includes:
   identifying a subset of the determined 2D line to 3D point correspondences; and
   identifying one or more candidate camera poses consistent with the subset of the determined 2D line to 3D point correspondences.

5. The method of claim 4, where estimating the pose of the camera further includes identifying additional subsets of the determined 2D line to 3D point correspondences, identifying one or more additional candidate camera poses for each of the additional subsets of 2D line to 3D point correspondences, and identifying a best overall camera pose from the candidate camera poses.

6. The method of claim 3, where each subset of correspondences includes six 2D line to 3D point correspondences, and each set of candidate camera poses includes sixteen candidate camera poses.

7. The method of claim 3, where each subset of correspondences includes six 2D line to 3D point correspondences, each 2D line is back-projected as a 3D plane in a camera coordinate system, and a minimal solver calculates a set of eight candidate camera poses by solving an algorithm that outputs pose solutions based on 3D plane to 3D point correspondences.

8. The method of claim 3, where each subset of correspondences includes twelve 2D line to 3D point correspondences, and each set of candidate camera poses includes a single candidate camera pose.

9. The method of claim 3, where the obfuscated image representation includes an indication of a gravity vector detected when the original unobfuscated image was captured, each subset of correspondences includes five 2D line to 3D point correspondences, and each set of candidate camera poses includes a single candidate camera pose calculated based on the gravity vector.

10. The method of claim 1, where a feature descriptor in the obfuscated image representation is a permuted feature descriptor that has been modified with a permutation randomly-selected from a known set of predefined permutations, and the method further comprises applying each permutation of the known set of predefined permutations to the permuted feature descriptor to create a plurality of permuted descriptor copies, searching for correspondences between each permuted descriptor copy and the plurality of 3D map features, and determining a correspondence between the feature descriptor and a 3D map feature if a permuted descriptor copy has at least a threshold similarity to the 3D map feature.

11. A method for estimating a camera pose, comprising:
    via a camera, capturing an image of a physical environment;
    detecting a plurality of image features at two-dimensional (2D) pixel locations within the image of the physical environment;
    generating a plurality of obfuscated features corresponding to the plurality of image features, each obfuscated feature including (i) a 2D line passing through the 2D pixel location of a corresponding image feature, and (ii) a feature descriptor that describes the corresponding image feature associated with the 2D pixel location that the 2D line of the obfuscated feature passes through;
    transmitting an obfuscated image representation to a remote device, the obfuscated image representation including the plurality of obfuscated features, the obfuscated image representation not including the 2D pixel locations of the plurality of image features; and
    receiving, from the remote device, a six degree of freedom pose of the camera within the physical environment estimated by the remote device based on correspondences between the obfuscated features and a plurality of three-dimensional (3D) map features defined at a plurality of 3D points within a 3D map of the physical environment previously acquired by the remote device.

12. The method of claim 11, where each image feature detected in the image has a (2D) position, a scale, a one-dimensional (1D) angular orientation, and a feature descriptor, and the obfuscated image representation does not include the 2D position, the scale, and the 1D angular orientation of the image feature.

13. The method of claim 11, further comprising, for each of the feature descriptors, applying a randomly-selected permutation from a predetermined set of permutations to the feature descriptor prior to transmitting the obfuscated image representation to the remote device.

14. The method of claim 11, where each 2D line has a randomly assigned direction.

15. A method for estimating a current camera pose, comprising:
    recognizing a three-dimensional (3D) map representing a physical environment, the 3D map including a plurality of 3D map features defined at a plurality of 3D points distributed throughout the 3D map;
    receiving an obfuscated 3D local map derived from two or more images of the physical environment having been captured by two or more cameras, the obfuscated 3D local map including a plurality of obfuscated features each including (i) a 3D feature representation that replaces a local 3D point of a local 3D image feature in a corresponding unobfuscated 3D local map, the unobfuscated 3D local map including a plurality of local 3D image features at a plurality of local 3D points, each local 3D point having been computed based on feature matching and triangulation of a plurality of 2D image features detected in the two or more images, and (ii) a feature descriptor that describes one of the 2D image features from which the local 3D image feature was triangulated;
    determining correspondences between the 3D feature representations in the obfuscated 3D local map and the plurality of 3D points of the plurality of 3D map features in the 3D map of the physical environment; and
    based on the determined correspondences, estimating a six degree of freedom pose of the two or more cameras in the physical environment.

16. The method of claim 15, where the 3D feature representations are 3D lines passing through the plurality of local 3D points of the plurality of local 3D image features in the unobfuscated 3D local map, each 3D line having a random direction, and the determined correspondences include at least three 3D line to 3D point correspondences.

17. The method of claim 15, where the 3D feature representations are 3D lines each having random directions, and the plurality of 3D map features in the 3D map of the physical environment are obfuscated map features, such that each obfuscated map feature takes the form of a 3D line of the 3D lines that has a random direction and that passes through a 3D point of a 3D map feature in an unobfuscated version of the 3D map.

18. The method of claim 15, where the 3D feature representations are 3D planes passing through the plurality of local 3D points in the unobfuscated 3D local map, each 3D plane having a random direction, and the determined correspondences include at least six 3D plane to 3D point correspondences.

19. The method of claim 15, where the obfuscated 3D local map includes an indication of a gravity vector detected when the two or more images were captured.

20. The method of claim 15, where the obfuscated 3D local map has a same scale as the 3D map of the physical environment.

* * * * *